(12) United States Patent
Vermani et al.

(10) Patent No.: US 9,521,557 B2
(45) Date of Patent: Dec. 13, 2016

(54) METHODS AND APPARATUS FOR CLEAR CHANNEL ASSESSMENT

(71) Applicant: QUALCOMM Incorporated, San Diego, CA (US)

(72) Inventors: Sameer Vermani, San Diego, CA (US); Simone Merlin, Solana Beach, CA (US); Eugene Jong-Hyon Baik, San Diego, CA (US); Bin Tian, San Diego, CA (US); Tevfik Yucek, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 14/290,899

(22) Filed: May 29, 2014

(65) Prior Publication Data

US 2014/0355556 A1 Dec. 4, 2014

Related U.S. Application Data

(60) Provisional application No. 61/830,630, filed on Jun. 3, 2013.

(51) Int. Cl.
*H04W 74/08* (2009.01)
*H04W 16/14* (2009.01)
(Continued)

(52) U.S. Cl.
CPC .......... *H04W 16/14* (2013.01); *H04L 27/0006* (2013.01); *H04L 27/2601* (2013.01);
(Continued)

(58) Field of Classification Search
CPC ............. H04W 74/0808; H04W 28/06; H04W 74/0816; H04W 72/04; H04W 74/006; H04W 72/042; H04W 74/0833; H04W 24/02; H04W 16/14; H04W 72/0453; H04W 84/12; H04W 72/0446; H04L 5/0044; H04L 47/10; H04L 5/0048; H04L 27/0006; H04L 27/2601
(Continued)

(56) References Cited

U.S. PATENT DOCUMENTS

| 8,811,203 | B1 * | 8/2014 | Liu | H04W 24/02 370/252 |
| 8,811,312 | B2 * | 8/2014 | Seok | H04W 72/04 370/252 |

(Continued)

FOREIGN PATENT DOCUMENTS

| CN | 1394404 A | 1/2003 |
| CN | 1780180 A | 5/2006 |

(Continued)

OTHER PUBLICATIONS

International Search Report and Written Opinion—PCT/US2014/040197—ISA/EPO—Nov. 10, 2014.
(Continued)

*Primary Examiner* — Edan Orgad
*Assistant Examiner* — Ivan O Latorre
(74) *Attorney, Agent, or Firm* — Knobbe Martens Olsen & Bear, LLP

(57) ABSTRACT

One aspect disclosed is a method in a wireless communications system including a first primary channel having a first frequency spectrum bandwidth and a second primary channel having a second frequency spectrum bandwidth, wherein the second frequency spectrum bandwidth includes the first frequency spectrum bandwidth. The method includes performing a first and a second back-off procedure at least partially in parallel, the first back-off procedure based on whether the first primary channel is idle, and the second back-off procedure based on whether the second
(Continued)

primary channel is idle, and transmitting a wireless message based on whether the first or the second back-off procedure completes first.

28 Claims, 12 Drawing Sheets

(51) Int. Cl.
*H04W 72/04* (2009.01)
*H04L 27/00* (2006.01)
*H04L 27/26* (2006.01)

(52) U.S. Cl.
CPC ... *H04W 72/0446* (2013.01); *H04W 72/0453* (2013.01); *H04W 74/0816* (2013.01)

(58) Field of Classification Search
USPC ............... 370/252, 328, 338, 445, 336, 329, 311,370/241; 455/522, 63.1, 67.13
See application file for complete search history.

(56) References Cited

U.S. PATENT DOCUMENTS

| | | | | |
|---|---|---|---|---|
| 2002/0075827 | A1* | 6/2002 | Balogh | H04L 1/0007 370/331 |
| 2002/0163933 | A1* | 11/2002 | Benveniste | H04L 47/10 370/465 |
| 2007/0266157 | A1* | 11/2007 | Xhafa | H04W 74/0808 709/225 |
| 2007/0297353 | A1* | 12/2007 | Habetha | H04W 74/02 370/310 |
| 2010/0190520 | A1* | 7/2010 | Reumerman | H04W 72/02 455/522 |
| 2011/0031674 | A1 | 2/2011 | Iguchi et al. | |
| 2011/0044273 | A1* | 2/2011 | Maltsev | H04L 5/0053 370/329 |
| 2011/0096747 | A1* | 4/2011 | Seok | H04W 72/04 370/329 |
| 2011/0292919 | A1* | 12/2011 | Trainin | H04L 5/0048 370/338 |
| 2011/0317674 | A1* | 12/2011 | Park | H04W 74/0816 370/338 |
| 2012/0044879 | A1 | 2/2012 | Park | |
| 2012/0057534 | A1 | 3/2012 | Park | |
| 2012/0155295 | A1 | 6/2012 | Trainin | |
| 2012/0182886 | A1* | 7/2012 | Ong | H04W 74/0816 370/252 |
| 2012/0182963 | A1* | 7/2012 | Kneckt | H04W 72/0453 370/330 |
| 2012/0207036 | A1* | 8/2012 | Ong | H04W 74/0816 370/252 |
| 2012/0218983 | A1* | 8/2012 | Noh | H04B 7/0452 370/338 |
| 2012/0236971 | A1 | 9/2012 | Taghavi et al. | |
| 2012/0314673 | A1 | 12/2012 | Noh et al. | |
| 2012/0327870 | A1* | 12/2012 | Grandhi | H04W 28/06 370/329 |
| 2013/0016737 | A1 | 1/2013 | Banerjea | |
| 2013/0017794 | A1 | 1/2013 | Kloper et al. | |
| 2013/0107833 | A1* | 5/2013 | Liu | H04W 72/082 370/329 |
| 2013/0136075 | A1 | 5/2013 | Yu et al. | |
| 2013/0294356 | A1* | 11/2013 | Bala | H04W 16/14 370/329 |
| 2014/0003367 | A1* | 1/2014 | Viger | H04W 74/0816 370/329 |
| 2014/0064101 | A1* | 3/2014 | Hart | H04W 74/0808 370/241 |
| 2014/0092857 | A1* | 4/2014 | Kneckt | H04W 74/04 370/329 |
| 2014/0355534 | A1 | 12/2014 | Vermani et al. | |
| 2015/0131641 | A1* | 5/2015 | Ong | H04W 48/20 370/338 |
| 2015/0200883 | A1* | 7/2015 | Brotherston | H04L 51/08 709/206 |
| 2016/0007379 | A1 | 1/2016 | Seok | |
| 2016/0029223 | A1 | 1/2016 | Vermani et al. | |

FOREIGN PATENT DOCUMENTS

| | | |
|---|---|---|
| CN | 102960044 A | 3/2013 |
| WO | WO-2012006035 A2 | 1/2012 |
| WO | WO-2012044706 A1 | 4/2012 |
| WO | WO-2012167193 A2 | 12/2012 |

OTHER PUBLICATIONS

Minyoung Park: "IEEE 802.11ac: Dynamic Bandwidth Channel Access", ICC 2011—2011 IEEE International Conference on Communications—Jun. 5-9, 2011—Kyoto, Japan, IEEE, Piscataway, NJ, USA, Jun. 5, 2011, pp. 1-5, XP031908841.

Partial International Search Report—PCT/US2014/040197—ISA/EPO—Oct. 1, 2014.

IEEE P802.11ac-2013, "IEEE Standard for Information technology—Telecommunications and Information Exchange Between Systems—LAN/MAN—Specific Requirements—Part 11: Wireless LAN Medium Access Control and Physical Layer Specifications—Amendment 4: Enhancements for Very High Throughput for Operation in Bands below 6 GHz", IEEE Computer Society, Dec. 11, 2013, pp. 1-395.

IEEE P802.11ad, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", IEEE Computer Society, Dec. 28, 2012, pp. 628.

Stacey R., et al., "Proposed TGac Draft Amendment; 11-10-1361-03-00ac-proposed-tgac-draft-amendment", IEEE SA Mentor; 11-10-1361-03-00AC-Proposed-TGAC-Draftamendment, IEEE-SA Mentor, Piscataway, NJ USA, vol. 802.11 ac, No. 3, Jan. 18, 2011, pp. 1-154, XP068035312.

* cited by examiner

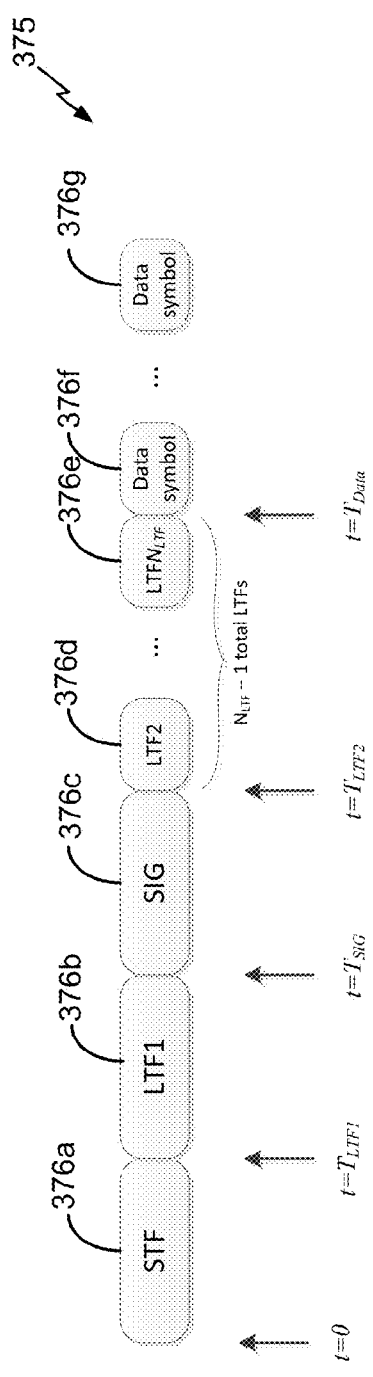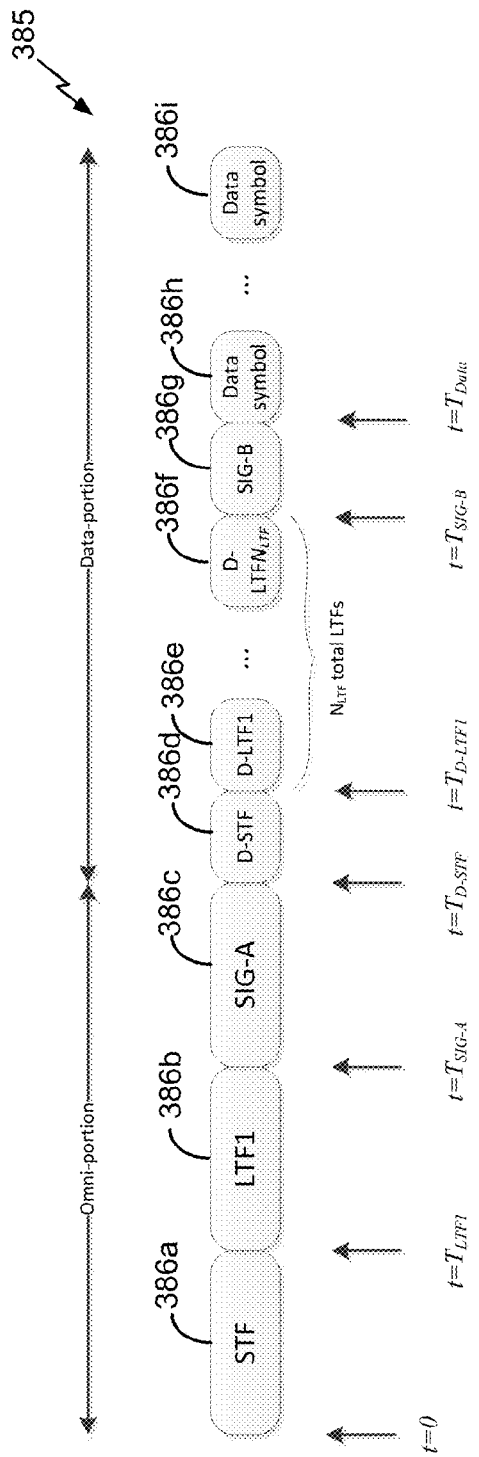
FIG. 3C
1MHz frame format and >=2MHz Short frame format
FIG. 3D
>=2MHz Long frame format

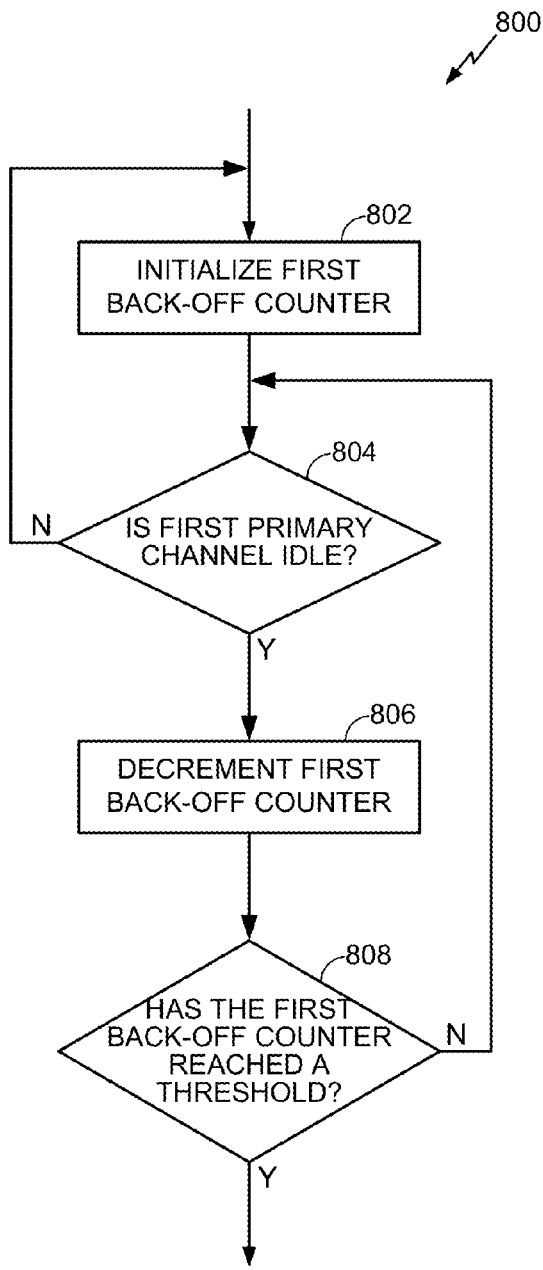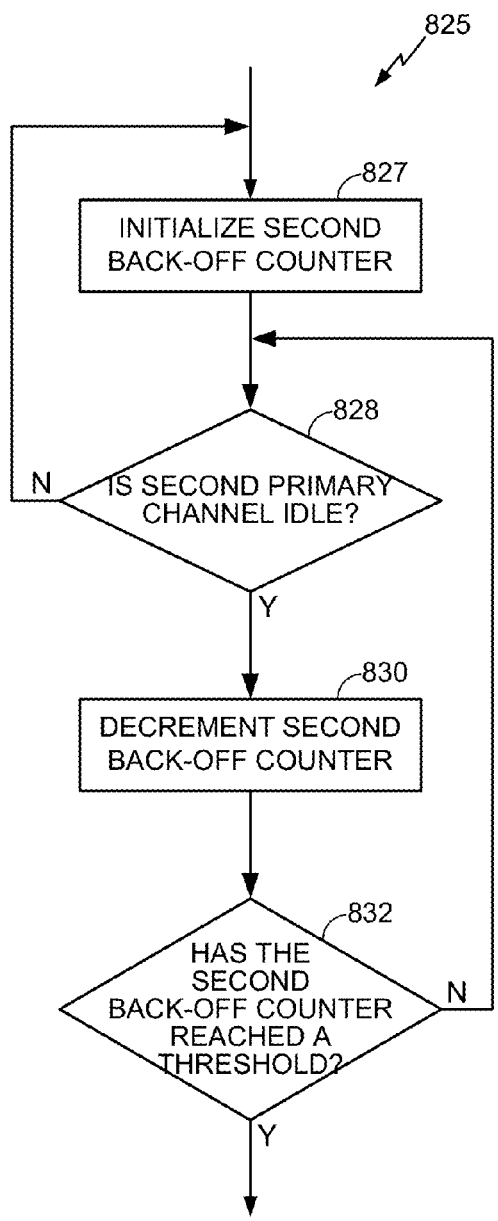
*FIG. 8A*                    *FIG. 8B*

METHODS AND APPARATUS FOR CLEAR CHANNEL ASSESSMENT

CROSS-REFERENCE TO RELATED APPLICATIONS

This Application claims the benefit of U.S. Provisional Application No. 61/830,630, filed Jun. 3, 2013, and entitled "METHODS AND APPARATUS FOR CLEAR CHANNEL ASSESSMENT" and assigned to the assignee hereof. The disclosure of this prior application is considered part of this application, and is hereby incorporated by reference in it's entirely.

This application is also related to U.S. patent application Ser. No. 14/290,849, filed May 29, 2014, entitled "METHODS AND APPARATUS FOR CLEAR CHANNEL ASSESSMENT," which is assigned to the assignee of the present application.

BACKGROUND

Field

The present application relates generally to wireless communications, and more specifically to systems, methods, and devices for channel-dependent clear channel assessment evaluation procedures.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

Various implementations of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations allow tuning of medium access parameters.

One aspect disclosed is a method of determining whether a two megahertz primary wireless channel is idle. The method includes determining whether a first preamble has been detected on the two megahertz primary channel during a first threshold period of time. determining whether a second preamble has been detected on a one megahertz primary channel during a second threshold period of time, determining whether a guard interval has been detected on the two megahertz primary channel during a third threshold period of time, determining whether the two megahertz primary channel is idle based at least in part on detection of the first preamble, the second preamble and the guard interval, and transmitting a wireless message based at least in part on whether the two megahertz primary channel is idle.

In some aspects, the method also includes detecting a two megahertz preamble as the first preamble. In some aspects, the method also includes detecting a one megahertz preamble as the second preamble. In some aspects, the method also includes detecting the presence of orthogonal frequency division multiplexing (OFDM) transmissions; and determining whether a guard interval has been detected based on the detecting. In some aspects, the method also includes determining whether a second guard interval has been detected on the one megahertz primary channel during a fourth threshold period of time, wherein the determining of whether the two megahertz primary channel is idle is further based on detection of the second guard interval. In some aspects, the method also includes performing a back-off procedure based on whether the two megahertz channel is idle; and transmitting a one megahertz message in response to completion of the back-off procedure.

Another aspect disclosed is an apparatus for determining whether a two megahertz primary wireless channel is idle. The apparatus includes a processor configured to determine whether a first preamble has been detected on the two megahertz primary channel during a first threshold period of time, determine whether a second preamble has been detected on a one megahertz primary channel during a second threshold period of time, determine whether a guard interval has been detected on the two megahertz primary channel during a third threshold period of time, determine whether the two megahertz primary channel is idle based at least in part on detection of the first preamble, the second preamble and the guard interval, and a transmitter configured to transmit a wireless message based at least in part on whether the two megahertz primary channel is idle. In some aspects, the processor is further configured to detect a two megahertz preamble as the first preamble. In some aspects, the processor is further configured to detect a one megahertz preamble as the second preamble. In some aspects, the processor is further configured to determine whether a guard interval has been detected by detecting the presence of orthogonal frequency division multiplexing (OFDM) transmissions.

In some aspects, the processor is further configured to determine whether a second guard interval has been detected on the one megahertz primary channel during a fourth threshold period of time, wherein the determining of whether the two megahertz primary channel is idle is further based on detection of the second guard interval. In some aspects, the processor is further configured to perform a back-off procedure based on whether the two megahertz channel is idle, and the transmitter is further configured to transmit a one megahertz message in response to completion of the back-off procedure.

Another aspect disclosed is an apparatus for determining whether a two megahertz primary wireless channel is idle. The apparatus includes means for determining whether a first preamble has been detected on the two megahertz primary channel during a first threshold period of time, means for determining whether a second preamble has been detected on a one megahertz primary channel during a second threshold period of time, means for determining whether a guard interval has been detected on the two megahertz primary channel during a third threshold period of time, means for determining whether the two megahertz primary channel is idle based at least in part on detection of the first preamble, the second preamble and the guard interval; and means for transmitting a wireless message based at least in part on whether the two megahertz primary channel is idle.

In some aspects, the means for determining whether the first preamble has been detected detects a two megahertz preamble. In some aspects, the means for determining whether the second preamble has been detected detects a one megahertz preamble. In some aspects, the means for determining whether a guard interval has been detected is configured to detect the presence of orthogonal frequency division multiplexing (OFDM) transmissions. In some aspects, the apparatus also includes means for determining whether a second guard interval has been detected on the one megahertz primary channel during a fourth threshold period of time. The means for determining whether the two megahertz primary channel is idle is further configured to base the determination on detection of the second guard interval.

In some aspects, the apparatus also includes means for performing a back-off procedure based on whether the two megahertz channel is idle, wherein the means for transmitting is further configured to transmit a one megahertz message in response to completion of the back-off procedure.

Another aspect disclosed is a computer readable storage medium that includes instructions that when executed cause one or more processor to perform a method of determining whether a two megahertz primary wireless channel is idle, The method includes determining whether a first preamble has been detected on the two megahertz primary channel during a first threshold period of time, determining whether a second preamble has been detected on a one megahertz primary channel during a second threshold period of time, determining whether a guard interval has been detected on the two megahertz primary channel during a third threshold period of time, determining whether the two megahertz primary channel is idle based at least in part on detection of the first preamble, the second preamble and the guard interval; and transmitting a wireless message based at least in part on whether the two megahertz primary channel is idle.

In some aspects, the method further comprises detecting a two megahertz preamble as the first preamble. In some aspects, the method further comprises detecting a one megahertz preamble as the first preamble.

In some aspects, the method further comprises detecting the presence of orthogonal frequency division multiplexing (OFDM), wherein the determining whether the guard interval has been detected is based on the detecting.

In some aspects, the method further comprises determining whether a second guard interval has been detected on the one megahertz primary channel during a fourth threshold period of time, wherein the determining of whether the two megahertz primary channel is idle is further based on detection of the second guard interval. In some aspects, the method also includes performing a back-off procedure based on whether the two megahertz channel is idle; and transmitting a one megahertz message in response to completion of the back-off procedure.

Another aspect disclosed is a method of determining whether a one megahertz primary wireless channel is idle. The method includes determining whether a preamble was detected on the one megahertz primary channel during a first threshold period of time, determining whether a guard interval was detected on the one megahertz primary channel during a second threshold period of time, determining whether the one megahertz primary channel is idle based at least in part on detection of the preamble and the guard interval; and transmitting a wireless message based at least in part on whether the one megahertz primary channel is idle. In some aspects, the method also includes detecting a one megahertz preamble as the preamble. In some aspects, determining whether a guard interval was detected comprises detecting the presence of orthogonal frequency division multiplexing (OFDM) transmissions or detecting a guard interval based on a mid-packet detection method.

Some aspects of the method further include determining whether a two megahertz primary channel is idle, wherein the transmitting of the wireless message is further based on whether the two megahertz channel is idle. In some aspects, the method further includes determining whether a secondary channel is idle for a PIFS time period before transmission of the wireless message, and transmitting the wireless message on the secondary channel if it was idle for the PIFS time period.

Another aspect disclosed is an apparatus for determining whether a one megahertz primary wireless channel is idle. The apparatus includes a processor configured to determine whether a preamble was detected on the one megahertz primary channel during a first threshold period of time, determine whether a guard interval was detected on the one megahertz primary channel during a second threshold period of time, and determine whether the one megahertz primary channel is idle based at least in part on detection of the preamble and the guard interval; and a transmitter configured to transmit a wireless message based at least in part on whether the one megahertz primary channel is idle.

In some aspects, the processor is further configured to detect a one megahertz preamble as the preamble. In some aspects, the processor is configured to determine whether a guard interval was detected by detecting the presence of orthogonal frequency division multiplexing (OFDM) transmissions or by detecting a guard interval based on a mid-packet detection method. In some aspects, the processor is further configured to determine whether a two megahertz primary channel is idle, wherein the transmitting of the wireless message is further based on whether the two megahertz channel is idle. In some aspects, the processor is further configured to determine whether a secondary channel is idle for a PCF Inter-frame Space (PIFS) time period before transmission of the wireless message, and the transmitter is further configured to transmit the wireless message on the secondary channel if it was idle for the PCF Interframe Space (PIFS) time period.

Another aspect disclosed is an apparatus for determining whether a one megahertz primary wireless channel is idle. The apparatus includes means for determining whether a preamble was detected on the one megahertz primary channel during a first threshold period of time, means for determining whether a guard interval was detected on the one megahertz primary channel during a second threshold period of time, means for determining whether the one megahertz primary channel is idle based at least in part on detection of the preamble and the guard interval; and means for transmitting a wireless message based at least in part on whether the one megahertz primary channel is idle.

In some aspects of the apparatus, the means for determining whether a preamble was detected determines whether a one megahertz preamble was detected. In some aspects of the apparatus, the means for determining whether a guard interval was detected is configured to detect the presence of orthogonal frequency division multiplexing (OFDM) transmissions or detect a guard interval based on a mid-packet detection method.

Some aspects of the apparatus include means for determining whether a two megahertz primary channel is idle, and the means for transmitting the wireless message is further configured to base the transmission of the wireless message on whether the two megahertz channel is idle. Some aspects of the apparatus include means for determining whether a secondary channel is idle for a PCF Inter-frame Space (PIFS) time period before transmission of the wireless message, and the means for transmitting is further configured to transmit the wireless message on the secondary channel if it was idle for the PCF Inter-frame Space (PIFS) time period.

Another aspect disclosed is a computer readable storage medium comprising instructions that when executed cause one or more processor to perform a method of determining whether a one megahertz primary wireless channel is idle. The method includes determining whether a preamble was detected on the one megahertz primary channel during a first threshold period of time, determining whether a guard interval was detected on the one megahertz primary channel during a second threshold period of time, determining whether the one megahertz primary channel is idle based at least in part on detection of the preamble and the guard interval; and transmitting a wireless message based at least in part on whether the one megahertz primary channel is idle.

In some aspects, the method further includes detecting a one megahertz preamble as the preamble. In some aspects, the method further includes detecting a guard interval based on detecting the presence of orthogonal frequency division multiplexing (OFDM) transmissions or based on a mid-packet detection method. In some aspects, the method further includes determining whether a two megahertz primary channel is idle, wherein transmitting the wireless message is further based on whether the two megahertz channel is idle. In some aspects, the method also includes determining whether a secondary channel is idle for a PCF Inter-frame Space (PIFS) time period before transmission of the wireless message, and the means for transmitting is further configured to transmit the wireless message on the secondary channel if it was idle for the PCF Inter-frame Space (PIFS) time period.

Another aspect disclosed is a method of transmitting a wireless message. The method includes decrementing a first back-off counter based on whether a one megahertz primary channel is idle, decrementing a second back-off counter based on whether a two megahertz primary channel is idle; and transmitting the wireless message based on at least the first and second back-off counters.

In some aspects, the method also includes determining whether one or more secondary channels are idle for a PCF Inter-frame Space (PIFS) time period before the transmission of the wireless message. The transmitting of the wireless message is further based on the determining. In some aspects, the method further includes transmitting the wireless message without utilizing a secondary channel if an amount of data waiting for transmission is below a data size threshold. In some aspects, the one or more secondary channels comprise a two megahertz channel, a four megahertz channel, and an eight megahertz channel. Some aspects of the method include transmitting the wireless message on a secondary channel if the secondary channel is idle PCF Inter-frame Space (PIFS) time before the transmission and the amount of data waiting for transmission is above the data size threshold. In some aspects, the method also includes determining whether the one megahertz primary channel is idle. The determining includes determining whether a preamble has been detected on the one megahertz primary channel during a first threshold period of time; and determining whether a guard interval has been detected on the one megahertz primary channel during a second threshold period of time.

In some aspects, the method also includes transmitting the wireless message on the one megahertz primary channel if the first back-off counter reaches a first threshold value before the second back-off counter has reached a second threshold value. In some aspects, the first threshold value and the second threshold value are zero. In some aspects, the method also includes transmitting the wireless message on the two megahertz primary channel if the second back-off counter reaches the second threshold value before the first back-off counter reaches the first threshold value. In some aspects, the method also includes determining whether the two megahertz primary channel is idle includes determining whether a first preamble has been detected on the two megahertz primary channel during a first threshold period of time, determining whether a second preamble has been detected on the one megahertz primary channel during a second threshold period of time, determining whether a guard interval has been detected on the two megahertz primary channel during a third threshold period of time; and determining whether the two megahertz primary channel is idle based at least in part on detection of the first preamble, the second preamble and the guard interval.

Another aspect disclosed is an apparatus for transmitting a wireless message. The apparatus includes a processor configured to decrement a first back-off counter based on whether a one megahertz primary channel is idle, and decrement a second back-off counter based on whether a two megahertz primary channel is idle; and a transmitter configured to transmit the wireless message based on at least the first and second back-off counters.

In some aspects, the processor is further configured to determine whether one or more secondary channels are idle for a PCF Inter-frame Space (PIFS) time period before the transmission of the wireless message, and the transmitter is further configured to transmit the wireless message is further based on the determining. In some aspects, the transmitter is further configured to not utilize a secondary channel for transmission of the wireless message if an amount of data waiting for transmission is below a data size threshold. In some aspects, the one or more secondary channels comprise a two megahertz channel, a four megahertz channel, and an eight megahertz channel. In some aspects, the transmitter is configured to transmit the wireless message on a secondary channel if the secondary channel is idle PCF Inter-frame Space (PIFS) time before the transmission and the amount of data waiting for transmission is above the data size threshold.

In some aspects, the processor is configured to determine whether the one megahertz primary channel is idle by determining whether a preamble has been detected on the one megahertz primary channel during a first threshold period of time; and determining whether a guard interval has been detected on the one megahertz primary channel during a second threshold period of time, determining whether the one megahertz primary channel is idle based at least in part on detection of the preamble and the guard interval.

In some aspects, the transmitter is configured to transmit the wireless message on the one megahertz primary channel when the first back-off counter reaches a first threshold value before the second back-off counter has reached a second threshold value. In some aspects, the first threshold value and the second threshold value are zero. In some aspects, the transmitter is configured to transmit the wireless message on the two megahertz primary channel when the second back-off counter reaches the second threshold value before the first back-off counter reaches the first threshold value. In some aspects, the processor is configured to determine whether the two megahertz primary channel is idle by: determining whether a first preamble has been detected on the two megahertz primary channel during a first threshold period of time, determining whether a second preamble has been detected on the one megahertz primary channel during a second threshold period of time, determining whether a guard interval has been detected on the two megahertz primary channel during a third threshold period of time; and determining whether the two megahertz primary channel is idle based at least in part on detection of the first preamble, the second preamble and the guard interval.

Another aspect disclosed is an apparatus for transmitting a wireless message. The apparatus includes means for decrementing a first back-off counter based on whether a one megahertz primary channel is idle, means for decrementing a second back-off counter based on whether a two megahertz primary channel is idle; and means for transmitting the wireless message based on at least the first and second back-off counters. In some aspects, the apparatus also includes means for determining whether one or more secondary channels are idle for a PCF Inter-frame Space (PIFS) time period before the means for transmitting transmits the wireless message, wherein the means for transmitting the wireless message is configured to transmit the message based on whether the one or more secondary channels are idle for a PCF Inter-frame Space (PIFS) time period before transmission of the wireless message. In some aspects, the means for transmitting is configured to utilize a secondary channel if an amount of data waiting for transmission is below a data size threshold. In some aspects, the one or more secondary channels comprise a two megahertz channel, a four megahertz channel, and an eight megahertz channel. In some aspects, the means for determining is configured to determine whether the one megahertz primary channel is idle by determining whether a preamble has been detected on the one megahertz primary channel during a first threshold period of time; and determining whether a guard interval has been detected on the one megahertz primary channel during a second threshold period of time, determining whether the one megahertz primary channel is idle based at least in part on detection of the preamble and the guard interval.

In some aspects, the means for transmitting the wireless message is configured to transmit the wireless message on the one megahertz primary channel when the first back-off counter reaches a first threshold value before the second back-off counter has reached a second threshold value. In some aspects, means for transmitting the wireless message is configured to transmit the message on the two megahertz primary channel when the second back-off counter reaches a second threshold value before the first back-off counter reaches the first threshold value. In some aspects, the first threshold value and the second threshold value are zero. In some aspects, the means for decrementing a second back-off counter based on whether a two megahertz primary channel is idle is configured to determine whether the two megahertz primary channel is idle by determining whether a first preamble has been detected on the two megahertz primary channel during a first threshold period of time, determining whether a second preamble has been detected on the one megahertz primary channel during a second threshold period of time, determining whether a guard interval has been detected on the two megahertz primary channel during a third threshold period of time; and determining whether the two megahertz primary channel is idle based at least in part on detection of the first preamble, the second preamble and the guard interval.

Another aspect disclosed is a computer readable storage medium including instructions that when executed cause one or more processors to perform a method of transmitting a wireless message. The method includes decrementing a first back-off counter based on whether a one megahertz primary channel is idle, decrementing a second back-off counter based on whether a two megahertz primary channel is idle; and transmitting the wireless message based on at least the first and second back-off counters.

Another aspect disclosed is a method of transmitting a wireless message. The method includes decrementing a first back-off counter based on whether a one megahertz primary channel is idle if a transmission bandwidth for the wireless message is one megahertz, decrementing a second back-off counter based on whether a two megahertz primary channel is idle if the transmission bandwidth for the wireless message is greater than one megahertz, transmitting the wireless message based on the first back-off counter if the transmission bandwidth is one megahertz; and transmitting the wireless message based on the second back-off counter if the transmission bandwidth is greater than one megahertz.

In some aspects, the method also includes updating the transmission bandwidth based on whether one or more secondary channels are idle for a PCF Inter-frame Space (PIFS) time period before the wireless message is transmitted if the transmission bandwidth is greater than one megahertz. In some aspects, updating of the transmission bandwidth is further based on whether an amount of data waiting for transmission is above a threshold. In some aspects, the one or more secondary channels comprise a two megahertz secondary channel, a four megahertz secondary channel, and an eight megahertz secondary channel. In some aspects, the method also includes determining to transmit the wireless message on a two megahertz primary channel if the amount of data available for transmission is below the threshold or if no secondary channels are idle for the PCF Inter-frame space (PIFS) time period when the second back-off counter reaches a threshold.

Another aspect disclosed is an apparatus for transmitting a wireless message. The apparatus includes a processor configured to decrement a first back-off counter based on whether a one megahertz primary channel is idle if a transmission bandwidth for the wireless message is one megahertz, and decrement a second back-off counter based on whether a two megahertz primary channel is idle if the transmission bandwidth for the wireless message is greater than one megahertz, a transmitter configured to: transmit the wireless message based on the first back-off counter if the transmission bandwidth is one megahertz, and transmit the wireless message based on the second back-off counter if the transmission bandwidth is greater than one megahertz.

In some aspects, the processor is further configured to update the transmission bandwidth based on whether one or more secondary channels are idle for a PCF Inter-frame Space (PIFS) time period before the wireless message is transmitted if the transmission bandwidth is greater than one megahertz. In some aspects, the processor is further configured to update the transmission bandwidth based on whether an amount of data waiting for transmission is above a threshold. In some aspects, the one or more secondary channels comprise a two megahertz secondary channel, a four megahertz secondary channel, and an eight megahertz secondary channel. In some aspects, the transmitter is configured to transmit the wireless message on a two megahertz primary channel if the amount of data waiting for transmission is below the threshold or no secondary channels are idle for the PCF Inter-frame space (PIFS) time period when the second back-off counter reaches a threshold.

Another aspect disclosed is an apparatus for transmitting a wireless message. The apparatus includes means for decrementing a first back-off counter based on whether a one megahertz primary channel is idle if a transmission bandwidth for the wireless message is one megahertz, means for decrementing a second back-off counter based on whether a two megahertz primary channel is idle if the transmission bandwidth for the wireless message is greater than one megahertz, means for transmitting the wireless message based on the first back-off counter if the transmission bandwidth is one megahertz; and means for transmitting the wireless message based on the second back-off counter if the transmission bandwidth is greater than one megahertz.

Some aspects of the apparatus also includes means for updating the transmission bandwidth based on whether one or more secondary channels are idle for a PCF Inter-frame Space (PIFS) time period before the wireless message is transmitted if the transmission bandwidth is greater than one megahertz. In some aspects, the means for updating is further configured to update the transmission bandwidth based on whether an amount of data waiting for transmission is above a threshold. In some aspects, one or more secondary channels comprise a two megahertz secondary channel, a four megahertz secondary channel, and an eight megahertz secondary channel. In some aspects, the means for transmitting is configured to transmit the wireless message on a two megahertz primary channel if the amount of data waiting for transmission is below the threshold or no secondary channels are idle for the PCF Inter-frame space (PIFS) time period when the second back-off counter reaches a threshold.

Another aspect disclosed is a computer readable storage medium comprising instructions that when executed cause a processor to perform a method of transmitting a wireless message. The method includes decrementing a first back-off counter based on whether a one megahertz primary channel is idle if a transmission bandwidth for the wireless message is one megahertz, decrementing a second back-off counter based on whether a two megahertz primary channel is idle if the transmission bandwidth for the wireless message is greater than one megahertz, transmitting the wireless message based on the first back-off counter if the transmission bandwidth is one megahertz; and transmitting the wireless message based on the second back-off counter if the transmission bandwidth is greater than one megahertz.

In some aspects, the method also includes updating the transmission bandwidth based on whether one or more secondary channels are idle for a PCF Inter-frame Space (PIFS) time period before the wireless message is transmitted if the transmission bandwidth is greater than one megahertz. In some aspects, the updating of the transmission bandwidth is further based on whether an amount of data waiting for transmission is above a threshold. In some aspects, the one or more secondary channels comprise a two megahertz secondary channel, a four megahertz secondary channel, and an eight megahertz secondary channel. In some aspects, the method also includes determining to transmit the wireless message on a two megahertz primary channel if the amount of data is below the threshold or no secondary channels are idle for the PCF Inter-frame space (PIFS) time period when the second back-off counter reaches a threshold.

BRIEF DESCRIPTION OF THE DRAWINGS

FIG. 3C illustrates an example of a one megahertz frame format and a greater than two megahertz short frame format.

FIG. 3D illustrates an example of a greater than two megahertz long frame format.

FIGS. 8A-C illustrate flow charts of one example implementation of a method for transmitting a wireless message.

DETAILED DESCRIPTION

Figure 1:
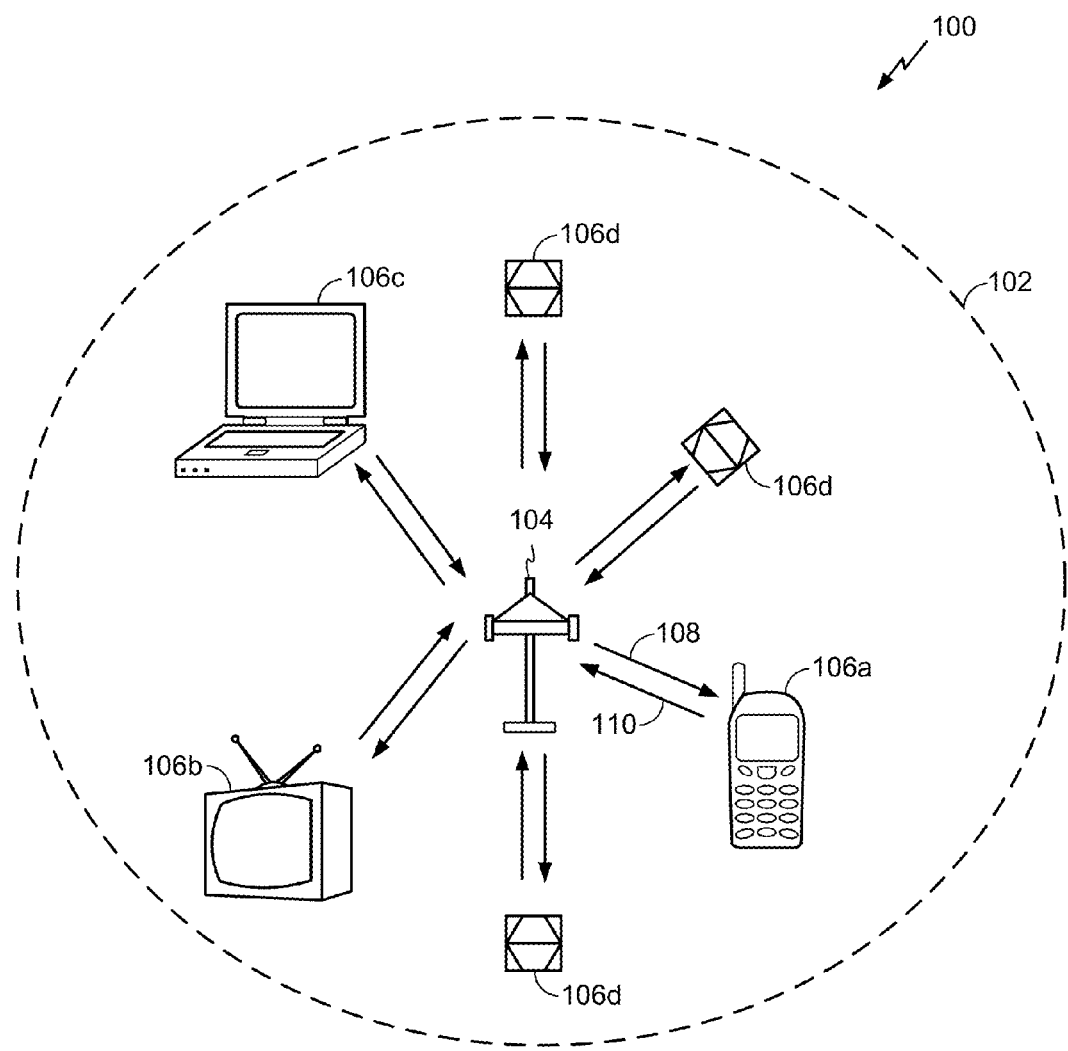
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations, an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Wireless nodes, such as stations and APs, may interact in a Carrier Sense Multiple Access (CSMA) type network, such as a network that conforms to the 802.11ah standard. CSMA is a probabilistic Media Access Control (MAC) protocol. "Carrier Sense" describes the fact that a node attempting to transmit on a medium may use feedback from its receiver to detect a carrier wave before trying to send its own transmission. "Multiple Access" describes the fact that multiple nodes may send and receive on a shared medium. Accordingly, in a CSMA type network, a transmitting node senses the medium and if the medium is busy (i.e. another node is transmitting on the medium), the transmitting node will defer its transmission to a later time. If, however, the medium is sensed as free, then the transmitting node may transmit its data on the medium.

Clear Channel Assessment (CCA) is used to determine the state of the medium before a node attempts to transmit thereon. The CCA procedure is executed while a node's receiver is turned on and the node is not currently transmitting a data unit such as a packet. A node may sense whether the medium is clear by, for example, detecting the start of a packet by detecting the packet's PHY preamble. This method may detect relatively weaker signals. Accordingly, there is a low detection threshold with this method. An alternative method is to detect some energy on the air, which may be referred to as energy detection (ED). This method is relatively more difficult than detecting the start of a packet and may only detect relatively stronger signals. As such, there is higher detection threshold with this method. In general, detection of another transmission on the medium is a function of the received power of the transmission, where the received power is the transmitted power minus the path loss.

While CSMA is particularly effective for mediums that are not heavily used, performance degradation may occur where the medium becomes crowded with many devices trying to access it simultaneously. When multiple transmitting nodes try to use the medium at once, collisions between the simultaneous transmissions may occur and transmitted data may be lost or corrupted. Because with wireless data communications it is generally not possible to listen to the medium while transmitting on it, collision detection is not possible. Further, transmissions by one node are generally only received by other nodes using the medium that are in range of the transmitting node. This is known as the hidden node problem, whereby, for example, a first node wishing to transmit to and in range of a receiving node, is not in range of a second node that is currently transmitting to the receiving node, and therefore the first node cannot know that the second node is transmitting to the receiving node and thus occupying the medium. In such a situation, the first node may sense that the medium is free and begin to transmit, which may then cause a collision and lost data at the receiving node. Accordingly, collision avoidance schemes are used to improve the performance of CSMA by attempting to divide access to the medium up somewhat equally among all transmitting nodes within a collision domain. Notably, collision avoidance differs from collision detection due to the nature of the medium, in this case the radio frequency spectrum.

In a CSMA network utilizing collision avoidance (CA), a node wishing to transmit first senses the medium and if the medium is busy then it defers (i.e. does not transmit) for a period of time. The period of deferral is followed by a randomized back off period i.e. an additional period of time in which the node wishing to transmit will not attempt to access the medium. The back off period is used to resolve contention between different nodes trying to access a medium at the same time. The back off period may also be referred to as a contention window. Backoff requires each node trying to access a medium to choose a random number in a range and wait for the chosen number of time slots before trying to access the medium, and to check whether a different node has accessed the medium before. The slot time is defined in such a way that a node will always be capable of determining if another node has accessed the medium at the beginning of the previous slot. In particular, the 802.11 standard uses an exponential back off algorithm. This back off algorithm specifies that each time a first node chooses a time slot for transmission, with that transmission resulting in a collision with a transmission from a second node, the first node will increase the maximum amount of the randomly selected back-off time. The maximum back-off increases in an exponential manner. If, on the other hand, a node wishing to transmit senses the medium as free for a specified time (called the Distributed Inter Frame Space (DIFS) in the 802.11 standard), then the node is allowed to transmit on the medium. After transmitting, the receiving node will perform a cyclic redundancy check (CRC) of the received data and send an acknowledgement back to the transmitting node. Receipt of the acknowledgment by the transmitting node will indicate to the transmitting node that no collision has occurred. Similarly, no receipt of an acknowledgment at the transmitting node will indicate that a collision has occurred and that the transmitting node should resend the data.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The STAs 106 are not limited in type and may include a variety of different STAs. For example, as illustrated in FIG. 1, STAs 106 can include a cellular phone 106a, a television 106b, a laptop 106c, and a number of sensors 106d (e.g. a weather sensor or other sensor capable of communicating using a wireless protocol), to name a few.

Figure 2:
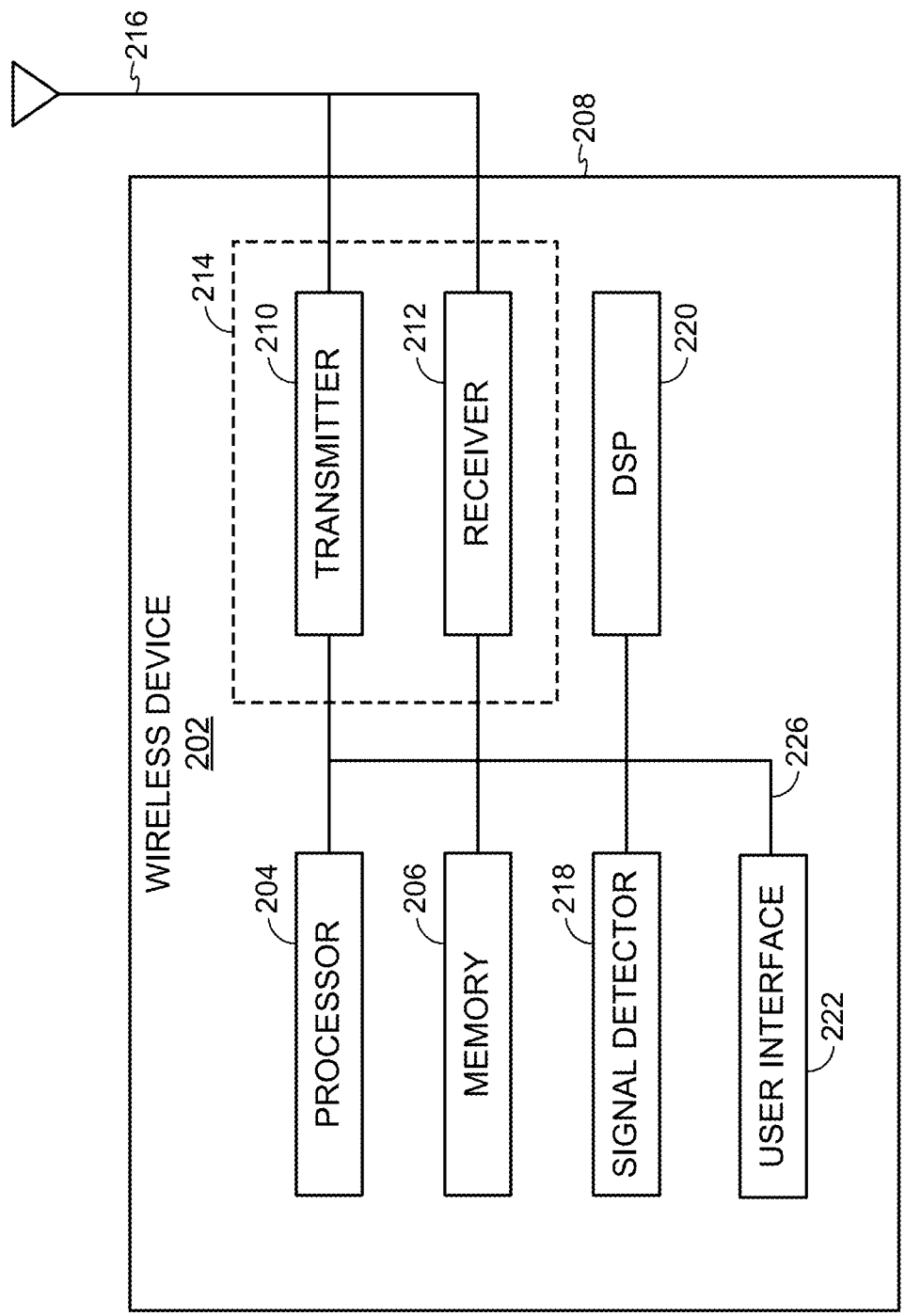
FIG. 2 illustrates an example of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a transmitter 210 and a receiver 212 to allow transmission and reception of data between the wireless device 202 and a remote location. Further, the transmitters 210 and the receiver 212 may be configured to allow transmission and reception of setup and/or configuration packets or frames between the wireless device 202 and a remote location including, for example, an AP. The transmitter 210 and receiver 212 may be combined into a transceiver 214. An antenna 216 may be attached to the housing 208 and electrically coupled to the transceiver 214. Alternatively, or additionally, the wireless device 202 may include an antenna 216 formed as part of the housing 208 or may be an internal antenna. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet or a frame.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be housed within a housing 208. Further, the various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together, or may accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

In certain wireless communications such as those specified in the IEEE 802.11ah protocol, a sub-gigahertz band may be used. This band may have a longer range than other higher bands, at the same transmission power. For example, these bands may have approximately twice the range of 2.4 GHz or 5 GHz bands, as used in IEEE 802.11n. This longer range may enable devices to communicate from a greater distance. However, in a busy area, this longer range may also mean that any individual device will hear transmissions from a large number of other devices. This may cause issues with the device having to defer to those other transmissions, and not being able to access the medium. For example, a device may check the medium prior to transmitting, and may be much more likely to find that the medium is busy if the device has a significantly longer range. One possible solution to this problem is to raise the CCA thresholds used by the device. This may make a device less sensitive to distant devices, and thus, defer to other devices less often. However, one issue with raising CCA thresholds is that low bandwidth devices and low power devices may not receive complete protection for their transmissions, as their transmissions may not be of sufficient energy level to exceed to the raised CCA thresholds. For example, sensors with 1 or 2 MHz bandwidth and with no PA may be an important use case of IEEE 802.11ah, and these devices may not receive complete protection for their transmissions with raised CCA thresholds. These sensors may use low power transmitters in order to minimize power usage.

Figure 3A:
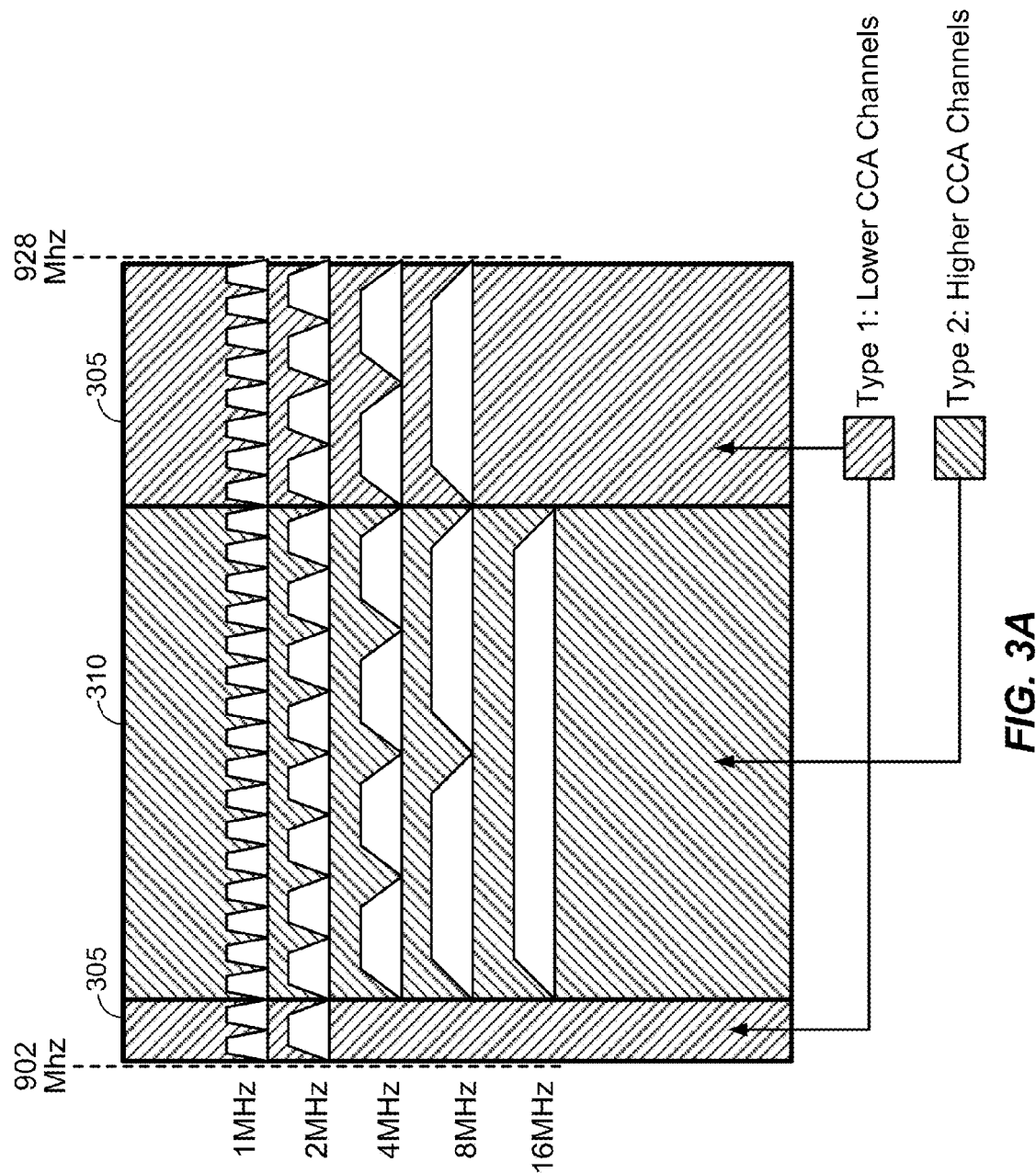
FIG. 3A illustrates an example of a division of channels into two or more types with different CCA thresholds.

In order to allow these low power and/or low bandwidth transmissions while still obtaining the benefits of increased CCA thresholds, the spectrum may be split into two or more types of channels, with different CCA thresholds associated with each of the two or more types of channels. For example, FIG. 3A is an illustration of a way to split the IEEE 802.11ah spectrum into two types of channels, with different CCA thresholds associated with the two types of channels. In FIG. 3A, the 26 MHz of spectrum that is used for IEEE 802.11ah has been divided into two types, the Type 1 Spectrum 305 and the Type 2 Spectrum 310.

The channels in the Type 2 Spectrum 310 may have higher CCA thresholds than the channels in the Type 1 Spectrum 305. For example, the channels in the Type 2 Spectrum 310 may have CCA thresholds that are 1 dB, 4 dB, 10 dB, 12 dB, 15 DB, or some other amount higher than those in the Type 1 Spectrum 305. These higher CCA thresholds may increase the proportion of times that devices wishing to use this portion of the spectrum are able to use these frequencies, as it may reduce the proportion of the time that such a device would determine that the spectrum is already in use. Similarly, other channels may be provided which have lower CCA thresholds. These channels may benefit low power and/or low bandwidth devices, which may receive more complete protection for their transmissions in the lower CCA threshold channels, as the lower CCA thresholds on these channels may mean that more devices in a wider area will defer to the transmissions of these low-power devices than would defer in a higher CCA threshold channel. In some aspects, higher bandwidth devices may be configured to prefer the high CCA threshold channels, such as using those channels as a default, while lower bandwidth devices may prefer to use the lower CCA threshold channels as a default.

The division of the channels in FIG. 3A is merely an example of a way to divide a spectrum. This division may also be done in other portions of the spectrum, and may be done in other manners. For example, more than two channels may be used. The division shown in FIG. 3A may be beneficial for certain portions of the spectrum, as it may allow the single 16 MHz channel contained within this portion of the spectrum to use the higher CCA thresholds. This may be beneficial, as it may allow higher bandwidth devices, such as cellular telephones, to use the 16 MHz channel more often, as the higher CCA thresholds in the Type 2 Spectrum 310 channels may allow these devices to more frequently access this channel with fewer times when the channel is found to be in use. While the division of the channels in FIG. 3A provides that no individual channel, such as the single 16 MHz channel, contains both Type 1 and Type 2 portions, other divisions may be used where single channels may contain parts which are higher CCA and parts which are lower CCA threshold channels. For example, CCA thresholds may be set that the first 1 MHz of a 2 MHz channel is a Type 2 channel, with higher CCA thresholds, and the second 2 MHz of a 2 MHz channel is a Type 1 channel, with lower CCA thresholds.

In some aspects, the CCA threshold levels for higher CCA threshold channels, such as Type 2 channels, may be derived from the CCA threshold levels of Type 1 channels. For example, the CCA threshold levels of Type 2 channels may be the CCA threshold levels of Type 1 channels, plus some protection factor. In some aspects, the protection factor may be expressed in decibels. This protection factor may be, for example, 1 dB, 4 dB, 10 dB, 12 dB, 15 dB, or some other dB level. In some aspects, the protection factor may be between 1 dB and 15 dB. This protection factor may be applied to each of the CCA thresholds for a channel.

For example, a channel may have three different CCA thresholds. A channel may have a higher CCA threshold for energy detection, a lower CCA threshold level for guard interval (GI) detection, and a lower-still CCA threshold level of signal detection. In some aspects, each of these CCA threshold levels of a Type 1 channel may be increased by a protection factor in a Type 2 channel. In some aspects, the protection factor for each level may be the same or may be different for each of the CCA thresholds. In some aspects, the protection factor used may differ for different bandwidth channels. For example, 8 MHz channels may use different CCA thresholds and different protection factors than 16 MHz channels.

In some aspects, FIG. 3A may represent a possible channelization for IEEE 801.11ah networks in some regions, such as in the United States. This channelization may be beneficial because there are no channels which straddles different CCA level regions. Another benefit of this channelization may be that there is a 16 MHz Type 2 channel provided, for high data-rate devices. It may also be beneficial that the two Type 1 channel areas are separated in frequency, which may help sensors avoid interference. In some aspects, other channelizations may be used. For example, other channelizations may be used in other regions.

Figure 3B:
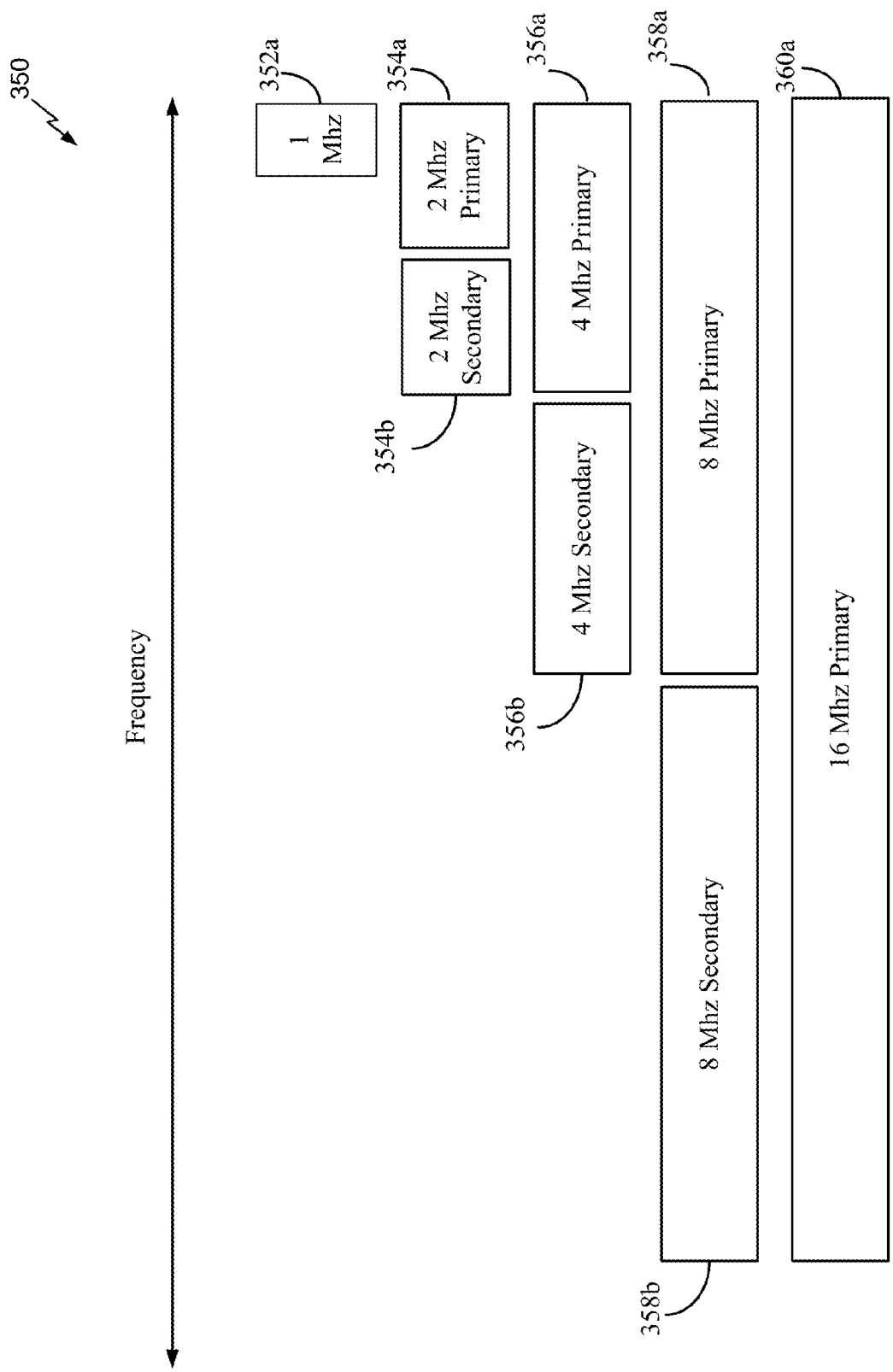
FIG. 3B illustrates one example organization of primary and secondary channels on a wireless communication medium utilized by the methods and systems disclosed.

FIG. 3B illustrates one example organization of primary and secondary channels on a wireless communication medium utilized by the methods and systems disclosed. The figure shows a one megahertz primary channel 352a, two megahertz primary and secondary channels 354a-b, four megahertz primary and secondary channels 356a-b, eight megahertz primary and secondary channels 358a-b, and a sixteen megahertz primary channel 360a.

Note that FIG. 3B is just one example of how primary and secondary channels may be organized on a wireless medium and utilized in the methods and systems disclosed below. For example, a 2 MHz secondary channel may not always to the left of a 2 MHz primary channel. Generally, a 2 MHz primary channel may span the 1 MHz primary channel, a 4 MHz primary channel may span the 2 MHz primary channel, and an 8 MHz primary channel may span the 4 MHz primary channel. In the example embodiment of FIG. 3B, a wireless message will be transmitted over one of the primary channels 352a, 354a, 356a, 358a, or 360a. Which primary channel it utilized for the transmission may depend on the result of a 2 MHz primary channel back off procedure and/or a 1 MHz primary channel back-off procedure.

In some of the methods and systems disclosed below, the availability of secondary channels may be determined for a PIFS time before transmission of the wireless message. If one or more secondary channels are available for the PIFS time before a message is transmitted, the message may be transmitted over a bandwidth that spans one of the available secondary channels and also includes a primary channel bandwidth.

FIG. 3C illustrates an example of a one megahertz frame format and a greater than two megahertz short frame format. The frame format 375 includes a short training field 376a, a first long training field 376b, a signal field 376c, a variable number of long training fields represented by long training fields 376d-e, and a variable number of data symbols represented by data symbols 376f-g. In some aspects, a one megahertz preamble may include fields 376a-376e. In some aspects, a two megahertz short frame preamble may include fields 376a-376e.

FIG. 3D illustrates an example of a greater than two megahertz long frame format. The frame format 385 includes a short training field 386a, a first long training field 386b, a signal-A field 386c, a short training field 386d, a variable number of long training fields represented by long training fields 376e-f, a signal-B field 386g, and a variable number of data symbols represented by data symbols 376h-i. In some aspects, a two megahertz long frame preamble may include fields 386a-386g.

Figure 4:
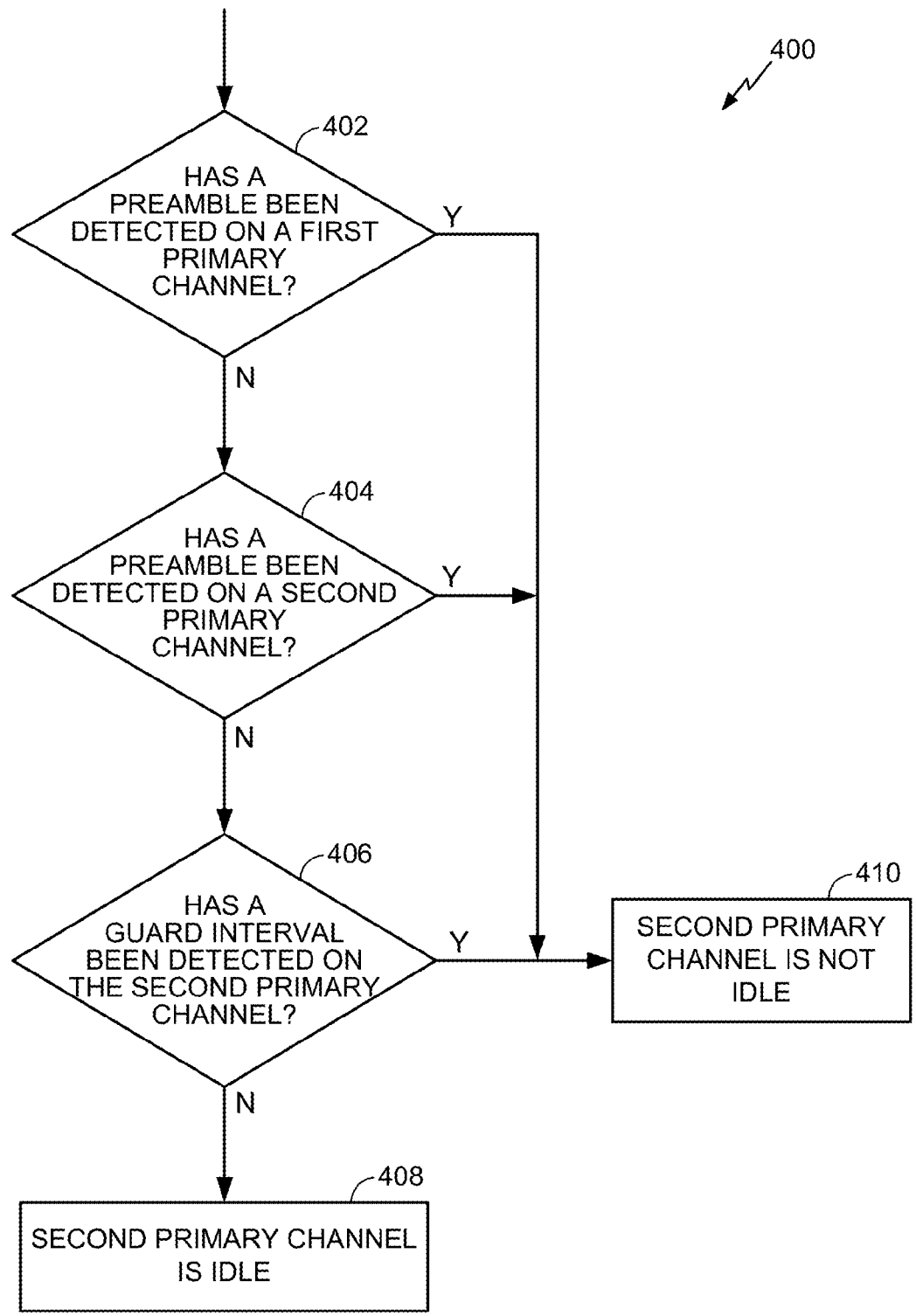
FIG. 4 illustrates a flow chart of one implementation of a method for determining whether a primary channel is idle.

FIG. 4 is a flowchart of one implementation of a method for determining whether a primary channel is idle in a wireless communications system including at least two primary channels. A frequency spectrum of a first primary channel is included in a frequency spectrum of a second primary channel. In some aspects, the first primary channel is a one megahertz primary channel, and the second primary channel is a two megahertz primary channel. In some aspects, the primary channel determined to be idle or not in process 400 is a two megahertz primary channel. In one aspect, process 400 may be performed by the wireless device 202 of FIG. 2. For example, in some aspects, blocks 402, 404, 406, 408, and 410 may be performed by the processor 204. In some aspects the order in which blocks 402, 404, and 406 are performed may be varied from that shown.

In some aspects, process 400 determines that a 2 Mhz primary channel is idle based on checking for a guard interval on the two megahertz primary channel. In some aspects, this may ameliorate the need to check a secondary one megahertz channel as part of a determination of whether a 2 Mhz primary channel is idle. By avoiding the need to analyze the one megahertz secondary channel, there may be a reduced need for one MHz channel filtering and preamble/guard interval detection on the one megahertz secondary channel. The 2 MHz guard interval detection, which supplements or replaces the secondary one megahertz channel verification, is still able to detect one MHz PPDUs in either upper or lower one MHz channels.

Decision block 402 determines whether a preamble has been detected on the first primary channel. In some aspects, this is a one megahertz primary channel. In some aspects, block 402 may determine whether a preamble has been detected on the first primary channel within a first threshold period of time. In some aspects, the preamble detected in block 402 is an 802.11ah one megahertz preamble. If the preamble was detected, process 400 moves to block 410, which determines that the second primary channel is not idle.

If no preamble is detected in block 402, process 400 moves to decision block 404, which determines whether a preamble has been detected on a second primary channel. In some aspects, decision block 404 may determine whether a preamble has been detected within a second threshold period of time on the second primary channel. In some aspects, the preamble detected in block 404 is an 802.11ah two megahertz preamble. If a preamble is detected in block 404, process 400 moves to block 410, which again determines that the second primary channel is not idle.

Otherwise, process 400 moves to block 406, which determines whether a guard interval has been detected on the second primary channel. In some aspects, detection of a guard interval may include detecting the presence of an 802.11ah OFDM transmission, or via any mid-packet detection method. If the guard interval is detected in block 406, process 400 again moves to block 410, which determines that the second primary channel is not idle.

If no guard interval has been detected, for example within a third threshold period of time, process 400 moves to block 408 where the second primary channel is determined to be idle.

In some aspects, whether the second primary channel is idle may also be based on whether a guard interval has been detected on the first primary channel. Similar to the guard interval detection on the second primary channel, guard interval detection on the first primary channel may include detecting the presence of an 802.11ah OFDM transmission through guard interval detection, or via any mid-packet detection method. For example, another mid-packet detection method is based on an energy level present on the medium. In some aspects, the energy on the medium may be compared to an estimated received power of a signal. In some aspects, if the energy level on the medium is within a threshold distance from the estimated received power, the method may determine that a packet is presently being transmitted on the medium. In these aspects, if a guard interval is detected on the first primary channel, process 400 moves to block 410 where the second primary channel is determined to be not idle. Note that although the description of process 400 above refers to a first, second, third, and fourth threshold period of time, in some aspects, these time periods may be equivalent or at least overlap. In some aspects, the first, second, third, and fourth threshold periods of time may be of equal duration or of different durations.

In some aspects, a wireless message may be transmitted over the second primary channel if the second primary channel is determined to be idle in block 408.

Figure 5:
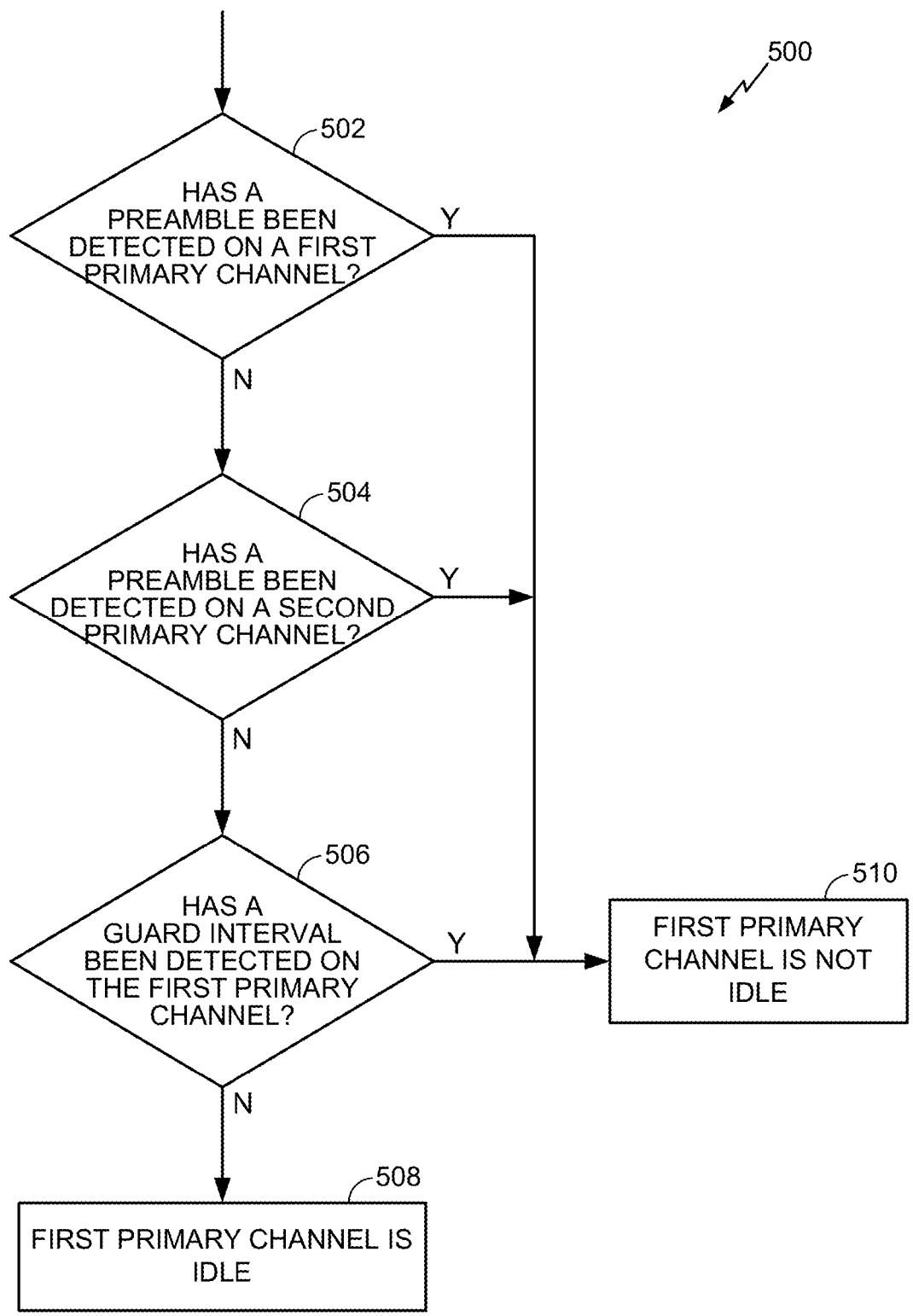
FIG. 5 illustrates a flow chart of one implementation of a method for determining whether a primary channel is idle.

FIG. 5 is a flowchart of one implementation of a method for determining whether a primary channel is idle in a wireless communications system including at least two primary channels. A frequency spectrum of a first primary channel is included in a frequency spectrum of a second primary channel. In some aspects, the first primary channel is a one megahertz primary channel, and the second primary channel is a two megahertz primary channel. In some aspects, the primary channel determined to be idle or not in process 500 is a one megahertz primary channel. In one aspect, process 500 may be performed by the wireless device 202 of FIG. 2. For example, in some aspects, blocks 502, 504, 506, 508, and 510 may be performed by the processor 204. In some aspects the order in which blocks 502, 504, and 506 are performed may be varied from that shown.

Decision block 502 determines whether a preamble has been detected on a first primary channel. In some aspects, block 502 may determine whether a preamble has been detected on the first primary channel within a first period of time. In some aspects, the preamble detected in block 502 is an 802.11ah one megahertz preamble. If the preamble was detected, process 500 moves to block 510, which determines that the first primary channel is not idle. If no preamble is detected in block 502, process 500 moves to decision block 504.

Block 504 determines whether a preamble has been detected on the second primary channel. In some aspects, decision block 504 may determine whether a preamble has been detected within a second period of time on the second primary channel. In some aspects, the preamble detected in block 504 is an 802.11ah two megahertz preamble. If a preamble is detected in block 504, process 500 moves to block 510, which again determines that the first primary channel is not idle. Otherwise, process 500 moves to block 506.

In some aspects, block 504 may not be performed. For example, if a one megahertz guard interval detection level is equivalent to a corresponding two MHz preamble detection level (for example, −3 dB), then block 504 may not be performed. Also, when, for example, the first primary channel is a one megahertz primary channel, one MHz only devices may not be able to perform block 504, and so in at least these aspects, block 504 may not be performed. This may be the case when a 1 MHz back-off is being performed on a primary 1 MHz channel.

Block 506 determines whether a guard interval has been detected on the first primary channel. In some aspects, detection of a guard interval may include detecting the presence of an 802.11ah OFDM transmission, or via any mid-packet detection method. If the guard interval is detected in block 506, process 500 again moves to block 510, which determines that the first primary channel is not idle.

If no guard interval has been detected, for example within a third threshold period of time, process 500 moves to block 508 where the first primary channel is determined to be idle. In some aspects, a wireless message may be transmitted over the first primary channel based on the determination in block 508. Note that although the description of process 500 above refers to a first, second, and third period of time, in some aspects, these time periods may be equivalent or at least overlap. In some aspects, the first, second, and third periods of time may be of equal duration or of different durations.

Figure 6:
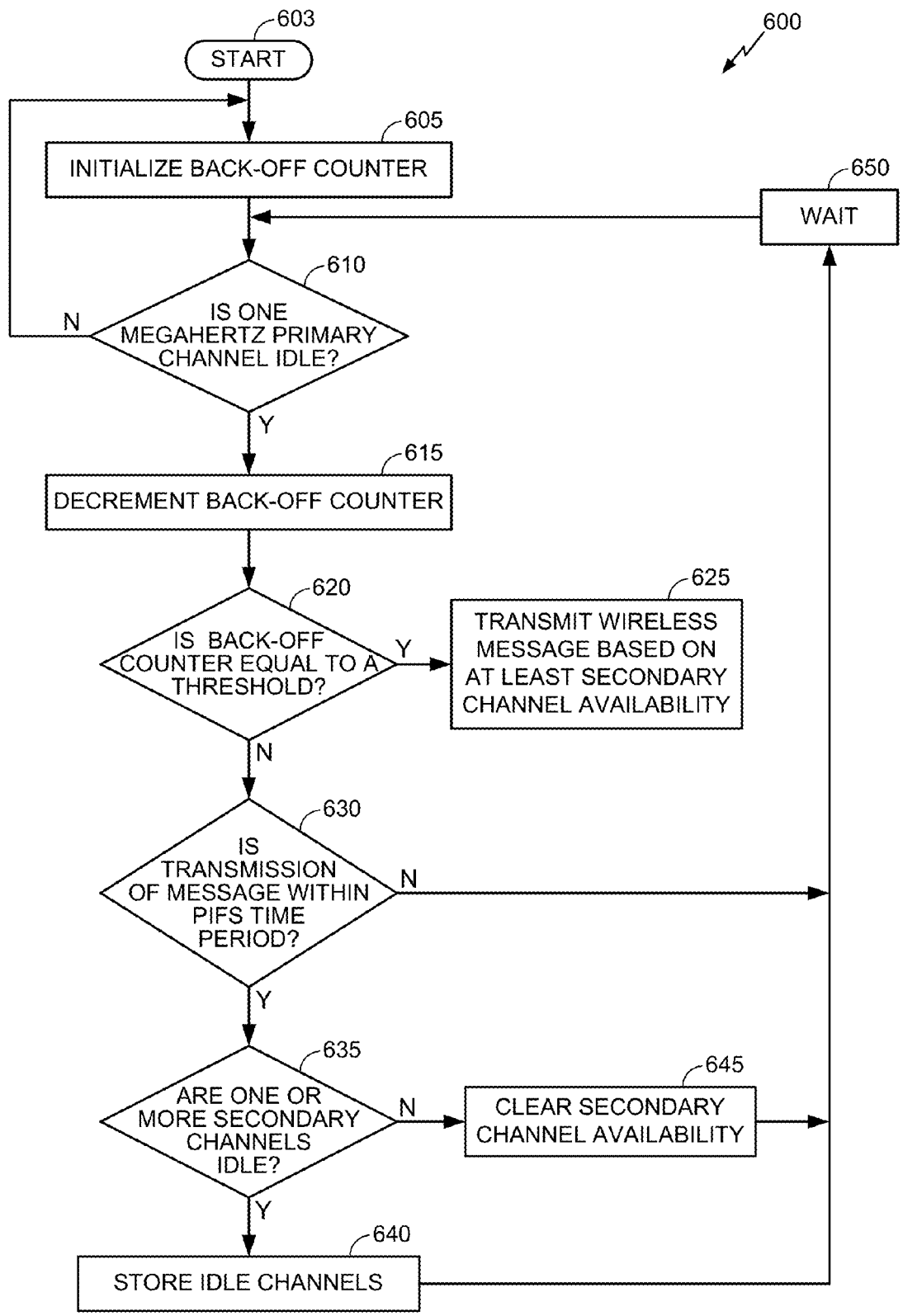
FIG. 6 illustrates a flow chart of one implementation of a method for transmitting a wireless message.

FIG. 6 is a flowchart of one implementation of a method for transmitting a wireless message. In one aspect, process 600 may be performed by the wireless device 202 of FIG. 2. For example, in some aspects, block 625 may be performed by the transmitter 210, while the remaining blocks of process 600 are performed by the processor 204. Process 600 illustrates use of a back-off counter controlled by whether a one megahertz primary channel is idle. If the back-off counter reaches a threshold value without the channel becoming non-idle, then a wireless message is transmitted. The message may be transmitted on either the one megahertz primary channel or on a secondary channel. A secondary channel need only be available for a PIFS time period before transmission on the secondary channel can be performed. In some aspects, one or more of the secondary channels can support a transmission bandwidth of two, four, or eight megahertz. In some aspects, the wireless message is transmitted with a one megahertz preamble. This may occur even when the message is transmitted over a secondary channel.

After start block 603, a back-off counter is initialized in block 605. Block 610 determines whether a one megahertz primary channel is idle. In some aspects, block 610 may determine whether the one megahertz primary channel is idle based on process 500, described above with respect to FIG. 5. If the one megahertz primary channel is not idle, process 600 returns to block 605 and the back-off counter is reinitialized. If the one megahertz primary channel is idle, block 615 decrements the back-off counter. Decision block 620 then determines whether the back-off counter is equal to a threshold value. For example, in some aspects, the back-off counter reaching a value of zero is considered to be when the back-off counter is equal to a threshold value. If the back-off counter reaches the threshold, block 625 transmits the wireless message based on at least secondary channel availability, discussed below. For example, the message may be transmitted over a secondary channel that has been idle for a PIFS time period, and that has been stored in block 640. If a secondary channel is idle for a PIFS time period, the transmission may span both a primary and a secondary channel bandwidth. For example, the transmission bandwidth may span both a 2 MHz primary channel and a 2 MHz secondary channel if the secondary channel was available for a PIFS time period before the transmission. In some aspects, even if one or more secondary channels are available, the transmission may still occur only on a primary channel. Generally, a transmission that is transmitted over the bandwidth allocated to a secondary channel also spans the transmission bandwidth allocated to the corresponding primary channel. For example, a transmission spanning the bandwidth allocated to a four megahertz secondary channel will also span the bandwidth of a four megahertz primary channel.

If the back-off counter has not reached the threshold, block 630 determines whether transmission of the wireless message that may occur within block 625 above will occur within a PIFS time period. If not, there is no need to check secondary channel availability, so block 650 waits for a period of time, then process 600 evaluates whether the one megahertz primary channel is idle at block 610.

If transmission of the wireless message in block 625 may occur within a PIFS time period, there is a need to determine what secondary channels may be available to support the transmission. Therefore, block 635 determines whether one or more secondary channels are idle. Availability of one or more secondary channels in block 635 may be determined based on at least an additional guard interval detection. If the secondary channels are not idle, block 645 clears any availability information and process 600 waits at block 650 as described above. If one or more secondary channels are available, this information is stored in block 640.

The secondary channel availability determined in block 635 and stored in block 640 is consulted or relied upon in block 625 when the message is transmitted. For example, block 640 may store both which secondary channels are available and at what time(s) they became available. When block 625 transmits the message, it may evaluate whether any secondary channels have been available for a PIFS time period based on the information stored in block 640. If one or more secondary channels has been available for a PIFS time period, then block 625 may transmit the message over a primary channel and a secondary channel associated with the primary channel. As described above, if an 8 MHz secondary channel is available for a PIFS time period before transmission, the transmission may occur using 16 MHz of total bandwidth, including both an 8 MHz primary channel and the 8 MHz secondary channel bandwidth for the transmission.

Process 600 then waits at block 650 as described above.

Note that while blocks 615-620 describe a back-off counter being decremented until it reaches a threshold value, it should be understood that the back-off counter may not be decremented in all implementations. For example, some implementations may increment a back-off counter until the counter is above a threshold value, before performing particular actions such as described by block 625. The important point is that the back-off counter is generally used to facilitate a measurement of a particular period of time passing before particular actions are taken.

In some aspects, use of a secondary channel for transmission in block 625 may be conditioned on an amount of data waiting for transmission. For example, if a relatively small amount of data is available for transmission, the data may not be large enough to adequately utilize a secondary channel during transmission. Use of a secondary channel in this circumstance may result in an inefficient use of wireless medium bandwidth. Therefore, in some aspects, if the amount of data waiting for transmission is less than a data size threshold, the transmission may occur on a primary channel only, even if secondary channels are available. If the amount of data waiting for transmission is above a data size threshold, then these aspects may utilize a secondary channel for the transmission (which includes bandwidth associated with a corresponding primary channel). Various aspects may either use or not use secondary channels if the amount of data waiting for transmission is equal to the data size threshold.

Figure 7:
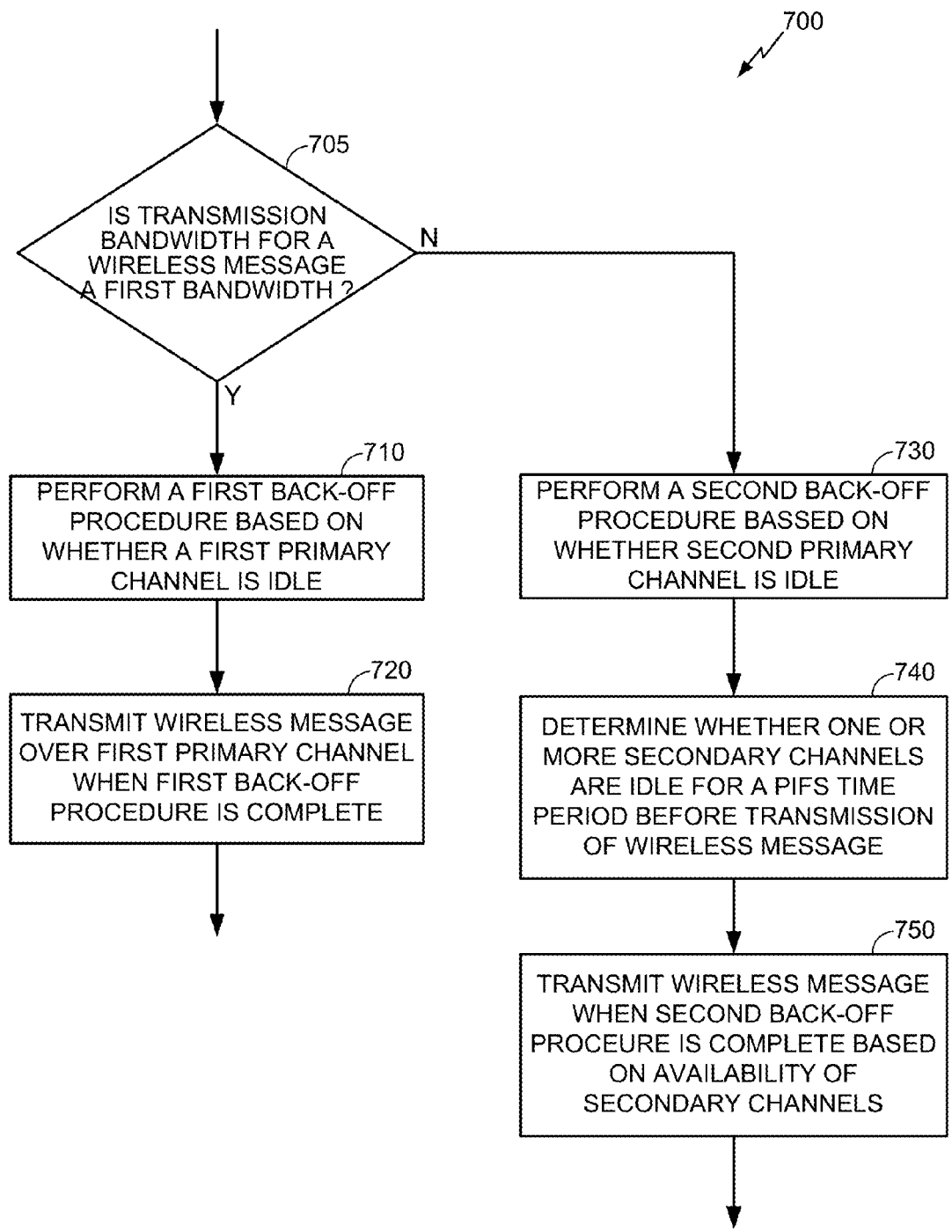
FIG. 7 illustrates a flow chart of one implementation of a method for transmitting a wireless message.

FIG. 7 is a flowchart of one implementation of a method for transmitting a wireless message in a wireless communications system including at least two primary channels. A frequency spectrum of a first primary channel is included in a frequency spectrum of a second primary channel. In some aspects, the first primary channel is a one megahertz primary channel, and the second primary channel is a two megahertz primary channel. In one aspect, process 700 may be performed by the wireless device 202 of FIG. 2. For example, in one aspect, blocks 720 and 750 may be performed by the transmitter 210. Blocks 705, 710, 730, and 740 may be performed by the processor 204 in some aspects.

Process 700 performs different back-off procedures based on a planned transmission bandwidth of a wireless message. For example, if an implementation plans to transmit the wireless message at one megahertz, a back-off procedure based on whether a one megahertz primary channel is idle is performed. Alternatively, if the implementation plans to transmit the wireless message at two megahertz, a back-off procedure based on whether a two megahertz primary channel is idle is performed.

Block 705 determines whether a transmission bandwidth for a wireless message is a first transmission bandwidth. In some aspects, the first transmission bandwidth is one megahertz. The first transmission bandwidth may be an initially planned transmission bandwidth. If the first transmission bandwidth is the first transmission bandwidth, a back-off procedure is performed based on whether the first primary channel is idle in block 710. In some aspects, whether the first primary channel is idle may be determined substantially in accordance with process 500, discussed above with reference to FIG. 5. After the first back-off procedure is completed in block 710, the wireless message is transmitted in block 720. The first back-off procedure may be considered complete in some aspects when a back-off counter used by the first back-off procedure reaches a threshold, for example, zero (0). In some aspects, when the back-off counter used by the first back-off procedure reaches the threshold value, the first back-off procedure is considered complete.

If the transmission bandwidth of the wireless message is not the first transmission bandwidth, block 730 performs a back-off procedure based on whether a second primary channel is idle. In some aspects, whether the second primary channel is idle may be determined substantially in accordance with process 400, illustrated above with respect to FIG. 4. Performing a second back-off procedure may include decrementing a back-off counter used by the second back-off procedure until the counter reaches a threshold value, for example, zero. In some aspects, when the second back-off procedure reaches the threshold, the second back-off procedure is considered complete.

Block 740 determines whether one or more secondary channels are idle for a PIFS time period before transmission of the wireless message. Block 740 may be performed in a similar manner as that discussed above with respect to FIG. 6. For example, whether one or more secondary channels are idle may be determined, in at least one aspect, based on a guard interval detection.

In some aspects, the secondary channels may include channels with a bandwidth of two, four, or eight megahertz. In some aspects, a secondary channel need only be idle for a PIFS time period before a device may initiate a transmission on the channel. Therefore, in some aspects, if a secondary channel has been idle for a PIFS time period at block 750, the transmission may be performed on the secondary channel. In some aspects, the transmission on the secondary channel may also span the corresponding primary channel. In some aspects, one or more secondary channels may support a higher bandwidth than one or more primary channels. Therefore, if the secondary channels are idle for the PIFS time period, some implementations may prioritize use of the secondary channels over use of only the primary channels. Other implementations may not prioritize use of one or more secondary channels over one or more primary channels.

If no secondary channels have been idle for a PIFS time period at block 750, block 750 may transmit the wireless message on the second primary channel. Alternatively, if any secondary channels that are idle for a PIFS time period at block 750 are not preferred by an implementation over the second primary channel, then block 750 may transmit the wireless message on the second primary channel even if one or more secondary channels have been idle for a PIFS time period.

In some aspects, block 740 may be conditioned on whether an amount of data waiting for transmission is above a data size threshold. For example, if an amount of data to be transmitted by the wireless message is below the data size threshold, secondary channel bandwidth may not be effectively utilized even if the secondary channel is available. Therefore, in some aspects, secondary channel availability may not be considered if the amount of data available for transmission is below the data size threshold. In these aspects, the transmission of the wireless message in block 750 may be performed only on a primary channel. In these aspects, if the amount of data is above the data size threshold, then block 740 is fully performed, and the data transmitted in block 750 may utilize secondary channel bandwidth (in addition to primary channel bandwidth) if the secondary channel is available for a PIFS time before the transmission. Note that various aspects may either utilize or not utilize secondary channel bandwidth if the amount of data waiting for transmission is equal to the data size threshold discussed above.

Figure 8C:
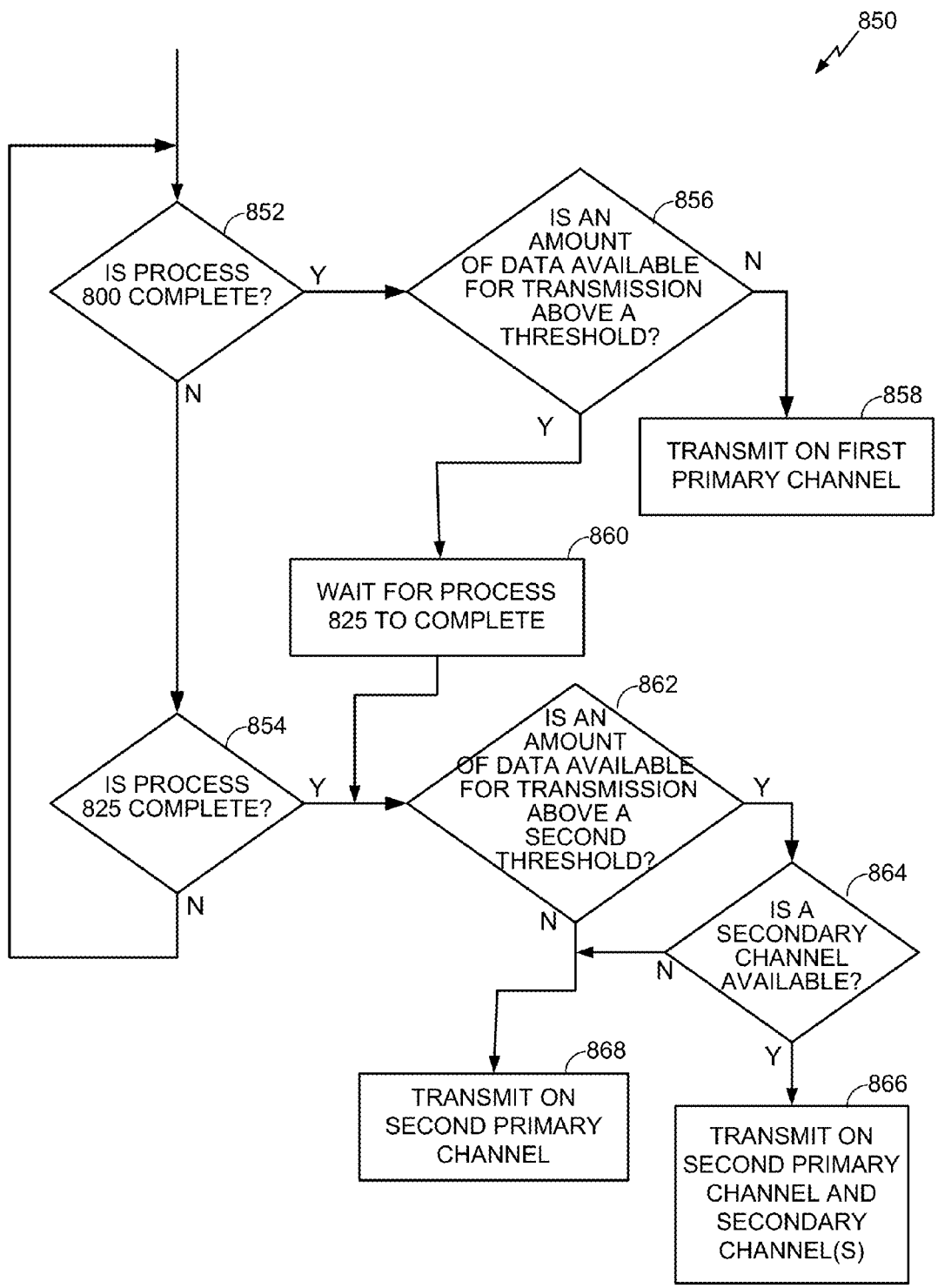

FIGS. 8A-C are flowcharts implementing an example method for transmitting a wireless message in a wireless communications system including at least two primary channels. A frequency spectrum bandwidth of a first primary channel is included in a frequency spectrum bandwidth of a second primary channel. In some aspects, the first primary channel is a one megahertz primary channel, and the second primary channel is a two megahertz primary channel. In some aspects, process 800 implements a back-off procedure for a first primary channel, for example, a one megahertz primary channel. In some aspects, process 825 implements a back-off procedure for a second primary channel, for example, a two megahertz primary channel. In one aspect, processes 800, 825, and 850 may be performed by the wireless device 202 of FIG. 2. For example, in one aspect, blocks 858, 866, and 868 may be may be performed by the transmitter 210. In one aspect, all other blocks of processes 800, 825, and 850 may be performed by the processor 204.

Processes 800 and 825 may be performed at least partially in parallel in some implementations. Process 800 performs a back-off procedure based on whether the first primary channel is idle (as shown by block 804). In some aspects, block 804 may be performed in substantial accordance with process 500, discussed above with respect to FIG. 5. In some aspects, the first back-off counter reaching its threshold, as described by decision block 808, may be equivalent to the first back-off counter reaching a value of zero (0).

Process 825 performs a back-off procedure based on whether the second primary channel is idle (as shown by block 828). In some aspects, block 828 may be performed in substantial accordance with process 400, discussed above with respect to FIG. 4. In some aspects, a second back-off counter reaching its threshold, as described by decision block 832, may be equivalent to the second back-off counter reaching a value of zero (0). Based on the availability of the first and/or second primary channels, process 800 or process 825 may reach their respective end blocks 810 and 834 before the other process.

Process 850 of FIG. 8C evaluates whether either of processes 800 or 825 have been completed in decision blocks 852 and 854 respectively. Whether either of blocks 800 and/or 825 are completed may be based, in some aspects, on whether the first and/or second back off counters, respectively, have reached their respective threshold values, in some aspects, zero. For example, process 800 may be complete in some aspects when decision block 808 takes determines the first back-off counter has reached its threshold. Process 825 may be complete in some aspects when decision block 832 determines that the second back-off counter has reached its threshold. Other aspects may utilize other criteria when determining whether a back-off procedure is complete. In some aspects, communications standard may specify that when a back-off procedure is complete, a device performing the back-off procedure may attempt a transmission on the wireless network.

Process 850 also operates in a wireless communications system including at least two primary channels. A frequency spectrum bandwidth of a first primary channel is included in a frequency spectrum bandwidth of a second primary channel. In some aspects, the first primary channel is a one megahertz primary channel, and the second primary channel is a two megahertz primary channel.

If process 800 completes first, process 850 moves to decision block 856 which evaluates whether an amount of data available for transmission is above a threshold. If the data available is large enough, a device performing process 850 may be able to utilize additional bandwidth to transmit the data. Therefore, if the amount of data is above a threshold, process 850 moves to block 860, which waits for process 825 (the second primary channel back-off) to complete. Otherwise, process 850 moves to block 858, which transmits the data on the first primary channel. Since the amount of data is relatively low in this case (i.e. below the threshold), the device performing process 850 may not be able to adequately utilize the bandwidth available from a larger bandwidth primary channel, such as a two megahertz primary and (potentially) a secondary channel. Thus, the data is transmitted via block 858.

In some aspects, block 856 is not performed. In these aspects, if process 800 completes first, the message or data is transmitted on the first primary channel (via block 858) without consideration for how much data is available for transmission.

When process 825 completes, process 850 moves to decision block 862. Block 862 evaluates whether an amount of data available for transmission is above a second threshold. In various aspects, the first threshold and second threshold may be the same or different threshold values.

If the amount of data available for transmission is large enough, a device performing process 850 may be able to utilize additional bandwidth from a secondary channel. If the amount of data available for transmission is below some amount, (the second threshold), then the device may not be able to adequately fill the bandwidth available via a secondary channel. Therefore, if the amount of data is below the second threshold, the device transmits the data on the second primary channel. If the amount of data is above the threshold, decision block 864 determines whether a secondary channel is available. The availability of a secondary channel may be based on whether the secondary channel has been idle for at least a PIFS time frame before the evaluation of availability occurs in block 864 or before the transmission in block 866 may occur. If a secondary channel is available, block 866 transmits the data on the secondary channel. The transmission in block 866 may span the second primary channel in some aspects. If either the amount of data available for transmission is below the second threshold (in block 862), or no secondary channel is available (in block 864), process 850 moves to block 868 which transmits the data on the second primary channel (only).

In some aspects, process 800 may not be performed. Therefore, in these aspects, process 850 may follow the path through decision block 862 to either block 864 or block 866. In some aspects, these implementations may transmit a one megahertz message (having a one megahertz preamble) over the two megahertz channel(s).

In some aspects, decision block 862 is not performed. In these aspects, secondary channel availability, as considered by block 864, is performed unconditionally after process 825 completes (via block 854). In these aspects, the transmission will utilize a secondary channel if available, regardless of an amount of data waiting for transmission.

Figure 9:
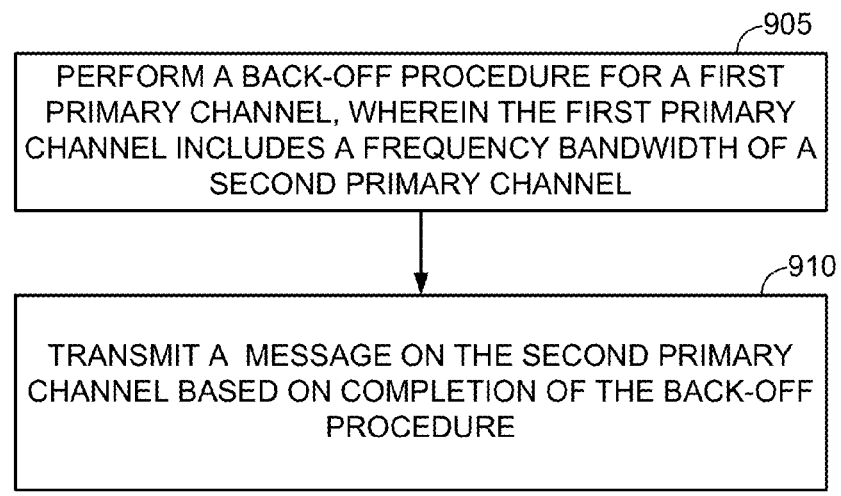
FIG. 9 is a flowchart of a method of transmitting a message based on completion of a back-off procedure.

FIG. 9 is a flowchart of a method of transmitting a message over a first primary channel based on completion of a back-off procedure corresponding to a second primary channel, where the second primary channel bandwidth includes the first primary channel. In some aspects, the transmitted message is transmitted with a one megahertz preamble. In some aspects, the method 900 may be performed by the device 202. For example, block 905 may be performed by the processor 204 and block 910 may be performed by the transmitter 210 in some aspects.

In some aspects, when a primary channel back-off procedure (such as a 2 Mhz primary channel back off procedure) completes (i.e. the back-off counter reaches a threshold value), a device is allowed to transmit a message on the primary channel. In some aspects, rather than transmit a message over a frequency bandwidth corresponding to the primary channel (i.e. the whole frame, and/or preamble corresponds to the primary channel. For example, if the primary channel is a two megahertz primary channel, the message is transmitted with a 2 Mhz preamble and uses 2 Mhz of frequency bandwidth in its transmission), the device may instead transmit the message over a second primary channel (such that the message preamble, data, etc. corresponds to a frequency bandwidth associated with the second primary channel) where the second primary channel bandwidth is contained within the first primary channel.

Thus, for example, a 1 MHz bandwidth message (i.e. frames, packets, etc.) may have particular characteristics not shared with other messages. For example, a one MHz message may be transmitted after channel access is gained via the primary channel 1 MHz back off procedure or upon completion of a primary 2 MHz back-off procedure. The may imply that since a single primary 2 MHz back-off procedure can be used to eventually transmit a message of any bandwidth (1, 2, 4, 8, 16 MHz), a particular implementer may choose to implement the primary 2 MHz back-off procedure, and refrain from implementing a primary 1 MHz back-off procedure. Since the primary 1 MHz back-off has slightly different criteria from the primary channel 2 MHz back-off as far as gaining channel access is concerned, there are some trade-offs to make when choosing not to support a 1 MHz back-off. However, these trade-offs may be acceptable for an overall reduction in complexity.

In block 905, a first back-off procedure is performed. The first back-off procedure corresponds to a first primary channel. The first primary channel includes a frequency bandwidth of a second primary channel. In some aspects, the first back-off procedure is a two megahertz primary channel back-off procedure, where the two megahertz primary channel frequency bandwidth includes the one megahertz primary channel frequency bandwidth. In some aspects, this procedure may substantially conform to process 1005 discussed below with respect to FIG. 10.

In block 910, a message is transmitted on a second primary channel based on completion of the first back-off procedure of block 905. In some aspects, a one megahertz message is transmitted on a one megahertz primary channel in block 910. A one megahertz message has a one megahertz preamble, and occupies the one megahertz primary channel. As discussed above, some devices implementing process 900 may not implement a one megahertz back off procedure, such as that described by FIG. 5.

Figure 10:
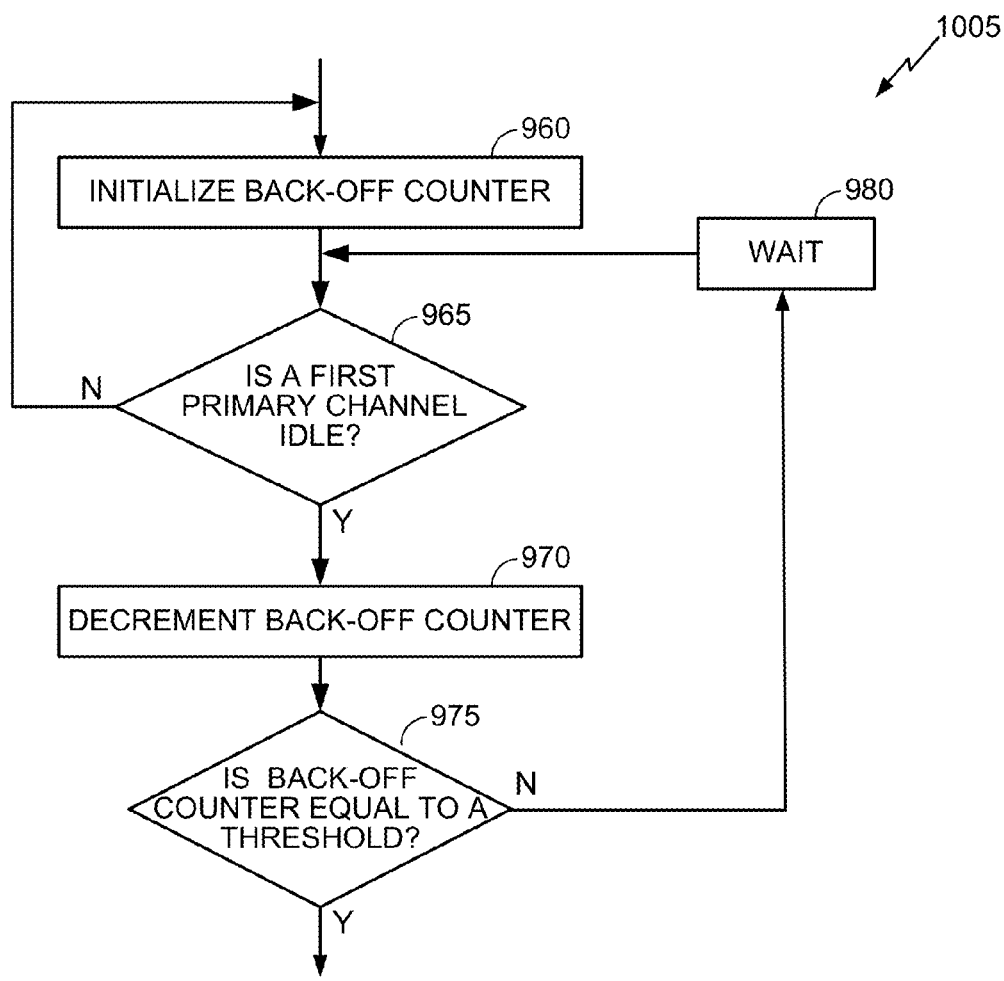
FIG. 10 is a flowchart of a method of performing a back-off procedure.

FIG. 10 is a flowchart of a method of performing a back-off procedure. In some aspects, the back-off procedure is for a two megahertz primary channel. In some aspects, process 1005 may be performed by the wireless device 202. For example, in some aspects, blocks 960-980 may be performed by the processor 204.

A back-off counter is initialized in block 960. Block 965 determines whether a first primary channel is idle. In some aspects, the first primary channel is a 2 Mhz primary channel. In some aspects, block 965 may be performed in substantial accordance with process 400, discussed above with respect to FIG. 4. In block 970, the back-off counter is decremented. Decision block 975 determines whether the back-off counter has reached a threshold (which may be zero in at least some aspects). If the back-off counter has reached its threshold, the back-off procedure is complete. Otherwise, process 1005 moves to block 980 where a wait process is performed. In some aspects, the wait block 980 may perform an exponential back-off as is known in the art. In other aspects, other wait periods may be determined. After waiting a period of time based on the particular back-off procedure implemented in process 1005, decision block 965 evaluates whether the first primary channel is idle. Process 1005 then continues as described above until reaching the termination condition described by decision block 975.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method in a wireless communications system including a first primary channel having a first frequency spectrum and a second primary channel having a second frequency spectrum, wherein the second frequency spectrum includes the first frequency spectrum, comprising:

performing, by a wireless device, a first and a second back-off procedure at least partially in parallel, each of the first and second back-off procedures conditionally update separate counters over individual periods of time when the first or second primary channels are idle respectively, conditionally reset the separate counters over the individual periods of time when the first or second primary channels are busy respectively, wherein the first and second back-off procedures are each complete when their respective counters reach a respective predetermined threshold value, wherein the second primary channel is not idle when the first primary channel is not idle;

transmitting a wireless message over the first primary channel in response to the first back-off procedure completing before the second back-off procedure; and transmitting the wireless message over the second primary channel in response to the second back-off procedure completing before the first back-off procedure.

2. The method of claim 1, further comprising determining whether one or more secondary channels with frequency spectrums within the second frequency spectrum are idle for a PCF Inter-frame Space (PIFS) time period before the transmission of the wireless message, wherein the transmitting of the wireless message is further based on the determining.

3. The method of claim 2, wherein the one or more secondary channels comprise a two megahertz channel, a four megahertz channel, and an eight megahertz channel.

4. The method of claim 3, further comprising transmitting the wireless message without utilizing the secondary channels if an amount of data waiting for transmission is below a data size threshold.

5. The method of claim 3, further comprising transmitting the wireless message on one of the secondary channels if the secondary channel is idle PCF Inter-frame Space (PIFS) time before the transmission and the amount of data waiting for transmission is above the data size threshold.

6. The method of claim 1, further comprising determining whether the first primary channel is idle, wherein the determining comprises:

determining whether a preamble has been detected on the first primary channel during a first period of time; and determining whether a guard interval has been detected on the first primary channel during a second period of time.

7. The method of claim 1, further comprising transmitting the wireless message on the first primary channel if the first back-off procedure completes before the second back-off procedure.

8. The method of claim 7, further comprising transmitting the wireless message on the second primary channel if the second back-off procedure completes first.

9. The method of claim 1, wherein determining whether the second primary channel is idle comprises:

determining whether a first preamble has been detected on the second primary channel during a first threshold period of time;

determining whether a second preamble has been detected on the first primary channel during a second threshold period of time;

determining whether a guard interval has been detected on the second primary channel during a third threshold period of time; and determining whether the second primary channel is idle based at least in part on detection of the first preamble, the second preamble and the guard interval.

10. The method of claim 1, wherein the second back-off procedure determines the second primary channel is not idle if a preamble is detected on the first primary channel.

11. A device in a wireless communications system including a first primary channel having a first frequency spectrum and a second primary channel having a second frequency spectrum, wherein the second frequency spectrum includes the first frequency spectrum, comprising:

a hardware processor configured to:

perform a first and a second back-off procedure at least partially in parallel, each of the first and second back-off procedures conditionally update separate counters over individual periods of time when the first or second primary channels are idle respectively, conditionally reset the separate counters over the individual periods of time when the first or second primary channels are busy respectively, wherein the first and second back-off procedures are each complete when their respective counters reach a respective predetermined threshold value, wherein the second primary channel is not idle when the first primary channel is not idle; and a transmitter configured to transmit a wireless message over the first primary channel in response to the first back-off procedure completing before the second back-off procedure; and transmit the wireless message over the second primary channel in response to the second back-off procedure completing before the first back-off procedure.

12. The device of claim 11, wherein the hardware processor is further configured to determine whether one or more secondary channels with frequency spectrums within the second frequency spectrum are idle for a PCF Inter-frame Space (PIFS) time period before the transmission of the wireless message, and wherein the transmitter is further configured to transmit the wireless message is further based on the determining.

13. The device of claim 12, wherein the one or more secondary channels comprise a two megahertz channel, a four megahertz channel, and an eight megahertz channel.

14. The device of claim 13, wherein the transmitter is further configured to not utilize the secondary channels for transmission of the wireless message if an amount of data waiting for transmission is below a data size threshold.

15. The device of claim 13, wherein the transmitter is configured to transmit the wireless message on one of the secondary channels if the secondary channel is idle PCF Inter-frame Space (PIFS) time before the transmission and the amount of data waiting for transmission is above the data size threshold.

16. The device of claim 11, wherein the hardware processor is configured to determine whether the first primary channel is idle by:
   determining whether a preamble has been detected on the first primary channel during a first period of time;
   determining whether a guard interval has been detected on the first primary channel during a second period of time; and
   determining whether the first primary channel is idle based at least in part on detection of the preamble and the guard interval.

17. The device of claim 11, wherein the transmitter is configured to transmit the wireless message on the first primary channel when the first back-off procedure completes before the second back-off procedure.

18. The device of claim 17, wherein the transmitter is configured to transmit the wireless message on the second primary channel when the second back-off procedure completes before the first back-off procedure.

19. The device of claim 11, wherein the hardware processor is configured to determine whether the second primary channel is idle by:
   determining whether a first preamble has been detected on the second primary channel during a first threshold period of time;
   determining whether a second preamble has been detected on the first primary channel during a second threshold period of time;
   determining whether a guard interval has been detected on the second primary channel during a third threshold period of time; and
   determining whether the second primary channel is idle based at least in part on detection of the first preamble, the second preamble and the guard interval.

20. A device in a wireless communications system including a first primary channel having a first frequency spectrum and a second primary channel having a second frequency spectrum, wherein the second frequency spectrum includes the first frequency spectrum, comprising:
   means for performing a first and a second back-off procedure at least partially in parallel, each of the first and second back-off procedures conditionally update separate counters over individual periods of time when the first or second primary channels are idle respectively, conditionally reset the separate counters over the individual periods of time when the first or second primary channels are busy respectively, wherein the first and second back-off procedures are each complete when their respective counters reach a respective predetermined threshold value, wherein the second primary channel is not idle when the first primary channel is not idle;
   means for transmitting a wireless message over the first primary channel in response to the first back-off procedure completing before the second back-off procedure; and
   means for transmitting the wireless message over the second primary channel in response to the second back-off procedure completing before the first back-off procedure.

21. The device of claim 20, further comprising means for determining whether one or more secondary channels with frequency spectrums within the second frequency spectrum are idle for a PCF Inter-frame Space (PIFS) time period before the means for transmitting transmits the wireless message, wherein the means for transmitting the wireless message is configured to transmit the message based on whether the one or more secondary channels are idle for a PCF Inter-frame Space (PIFS) time period before transmission of the wireless message.

22. The device of claim 21, wherein the one or more secondary channels comprise a two megahertz channel, a four megahertz channel, and an eight megahertz channel.

23. The device of claim 22, wherein the means for transmitting is configured to utilize one of the secondary channels if an amount of data waiting for transmission is below a data size threshold.

24. The device of claim 20, wherein the means for determining is configured to determine whether the first primary channel is idle by:
   determining whether a preamble has been detected on the first primary channel during a first period of time;
   determining whether a guard interval has been detected on the first primary channel during a second period of time; and
   determining whether the first primary channel is idle based at least in part on detection of the preamble and the guard interval.

25. The device of claim 20, wherein the means for transmitting the wireless message is configured to transmit the wireless message on the first primary channel if the first back-off procedure completes before the second back-off procedure.

26. The device of claim 25, wherein means for transmitting the wireless message is configured to transmit the message on the second primary channel when the second back-off procedure completes before the first back-off procedure.

27. The device of claim 20, wherein the means for performing the first and second back-off procedure is configured to determine whether the second primary channel is idle by:
   determining whether a first preamble has been detected on the second primary channel during a first threshold period of time;
   determining whether a second preamble has been detected on the first primary channel during a second threshold period of time;
   determining whether a guard interval has been detected on the second primary channel during a third threshold period of time; and
   determining whether the second primary channel is idle based at least in part on detection of the first preamble, the second preamble and the guard interval.

28. A non-transitory computer readable storage medium comprising instructions that when executed cause one or more hardware processors to perform a method in a wireless communications system including a first primary channel having a first frequency spectrum and a second primary channel having a second frequency spectrum, wherein the second frequency spectrum includes the first frequency spectrum, the method comprising:
   performing, by a wireless device, a first and a second back-off procedure at least partially in parallel, each of the first and second back-off procedures conditionally update separate counters over individual periods of time when the first or second primary channels are idle respectively, conditionally reset the separate counters over the individual periods of time when the first or second primary channels are busy respectively, wherein the first and second back-off procedures are each complete when their respective counters reach a respective predetermined threshold value, wherein the second primary channel is not idle when the first primary channel is not idle;

transmitting a wireless message over the first primary channel in response to the first back-off procedure completing before the second back-off procedure; and transmitting the wireless message over the second primary channel in response to the second back-off procedure completing before the first back-off procedure.

* * * * *